US011825517B2

(12) United States Patent
Wang et al.

(10) Patent No.: US 11,825,517 B2
(45) Date of Patent: Nov. 21, 2023

(54) EARLY SHARING FOR COLLABORATIVE SENSING IN SIDELINK

(71) Applicant: QUALCOMM Incorporated, San Diego, CA (US)

(72) Inventors: Xiaojie Wang, Hillsborough, NJ (US); Junyi Li, Franklin Park, NJ (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 17/173,785

(22) Filed: Feb. 11, 2021

(65) Prior Publication Data

US 2022/0256593 A1 Aug. 11, 2022

(51) Int. Cl.
*H04W 74/04* (2009.01)
*H04W 72/04* (2023.01)

(52) U.S. Cl.
CPC ........... *H04W 74/04* (2013.01); *H04W 72/04* (2013.01)

(58) Field of Classification Search
CPC .............................. H04W 74/04; H04W 72/04
USPC .......................................................... 370/329
See application file for complete search history.

(56) References Cited

U.S. PATENT DOCUMENTS

| 2020/0229143 | A1* | 7/2020 | Wei | H04W 72/23 |
| 2020/0288433 | A1* | 9/2020 | Yu | H04W 72/0453 |
| 2020/0374861 | A1* | 11/2020 | Shilov | H04W 72/20 |
| 2022/0346065 | A1* | 10/2022 | Hui | H04W 72/0446 |
| 2022/0386284 | A1* | 12/2022 | Zhao | H04W 72/541 |

FOREIGN PATENT DOCUMENTS

| CN | 114071659 A | * | 2/2022 |
| CN | 114765752 A | * | 7/2022 |

OTHER PUBLICATIONS

U.S. Appl. No. 63/132,300, filed Dec. 30, 2020.*

* cited by examiner

*Primary Examiner* — Faisal Choudhury
(74) *Attorney, Agent, or Firm* — Harrity & Harrity, LLP

(57) ABSTRACT

Various aspects of the present disclosure generally relate to wireless communication. In some aspects, a user equipment (UE) may identify that a sidelink communication is to be transmitted by the UE prior to a next sensing results sharing opportunity associated with a collaborative sensing schedule that is associated with resource selection for sidelink communications for a group of UEs that includes the UE. The UE may select resources for the sidelink communication. The UE may transmit the sidelink communication using the resources. Numerous other aspects are described.

30 Claims, 11 Drawing Sheets

EARLY SHARING FOR COLLABORATIVE SENSING IN SIDELINK

FIELD OF THE DISCLOSURE

Aspects of the present disclosure generally relate to wireless communication and to techniques and apparatuses for early sharing for collaborative sensing in sidelink.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes identifying that a sidelink communication is to be transmitted by the UE prior to a next sensing results sharing opportunity associated with a collaborative sensing schedule that is associated with resource selection for sidelink communications for a group of UEs that includes the UE; selecting resources for the sidelink communication; and transmitting the sidelink communication using the resources.

In some aspects, a UE for wireless communication includes a memory and one or more processors operatively coupled to the memory. The memory and the one or more processors may be configured to: identify that a sidelink communication is to be transmitted by the UE prior to a next sensing results sharing opportunity associated with a collaborative sensing schedule that is associated with resource selection for sidelink communications for a group of UEs that includes the UE; select resources for the sidelink communication; and transmit the sidelink communication using the resources.

In some aspects, a non-transitory computer-readable medium storing a set of instructions for wireless communication includes one or more instructions that, when executed by one or more processors of a UE, cause the UE to: identify that a sidelink communication is to be transmitted by the UE prior to a next sensing results sharing opportunity associated with a collaborative sensing schedule that is associated with resource selection for sidelink communications for a group of UEs that includes the UE; select resources for the sidelink communication; and transmit the sidelink communication using the resources.

In some aspects, an apparatus for wireless communication includes means for identifying that a sidelink communication is to be transmitted by the apparatus prior to a next sensing results sharing opportunity associated with a collaborative sensing schedule that is associated with resource selection for sidelink communications for a group of apparatuses that includes the apparatus; means for selecting resources for the sidelink communication; and means for transmitting the sidelink communication using the resources.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
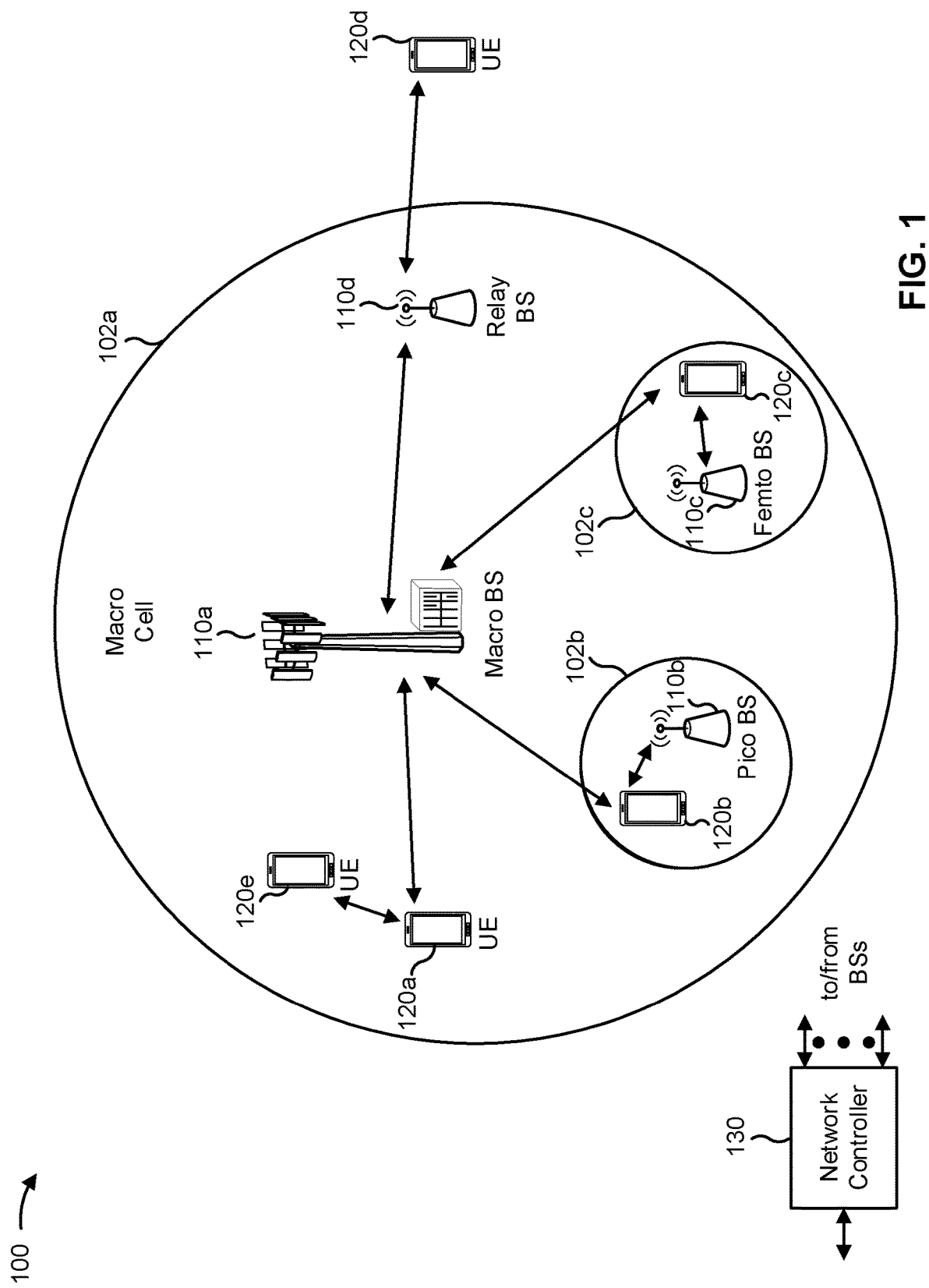
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

In some aspects, a UE 120 may operate using a transmission mode where resource selection and/or scheduling is performed by the UE 120 (e.g., rather than a base station 110). For example, the UE 120 may perform a channel sensing procedure to determine a channel availability (e.g., available resources and/or reserved resources) for one or more sidelink channels. The UE 120 may select resources for communications on the one or more sidelink channels based at least in part on the determined channel availability.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
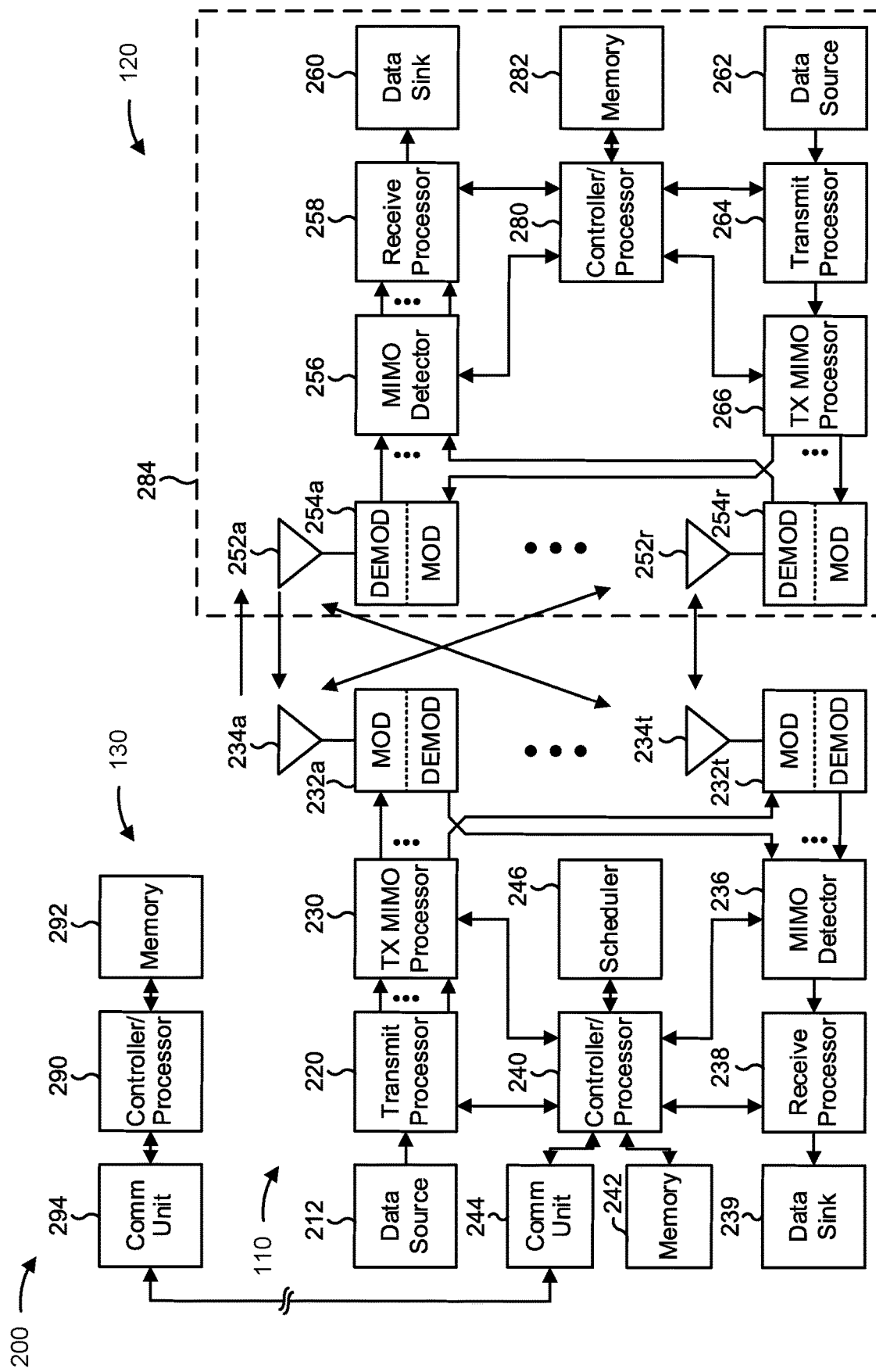
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-10.

Controller/processor 240 of base station 110, controller/processor 280 of UE 120, and/or any other component(s) of FIG. 2 may perform one or more techniques associated with early sharing for collaborative sensing in sidelink, as described in more detail elsewhere herein. For example, controller/processor 240 of base station 110, controller/processor 280 of UE 120, and/or any other component(s) of FIG. 2 may perform or direct operations of, for example, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, and/or other processes as described herein. In some aspects, executing instructions may include running the instructions, converting the instructions, compiling the instructions, and/or interpreting the instructions, among other examples.

In some aspects, the UE 120 includes means for identifying that a sidelink communication is to be transmitted by the UE prior to a next sensing results sharing opportunity associated with a collaborative sensing schedule that is associated with resource selection for sidelink communications for a group of UEs that includes the UE; means for selecting resources for the sidelink communication; and/or means for transmitting the sidelink communication using the resources. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for communicating, with the group of UEs, to determine the collaborative sensing schedule.

In some aspects, the UE 120 includes means for receiving, from another UE included in the group of UEs, sensing results, associated with a cycle of the collaborative sensing schedule, that indicate a channel availability for sidelink communications, wherein the sensing results are received prior to identifying that the sidelink communication is to be transmitted by the UE. In some aspects, the UE 120 includes means for selecting the resources for the sidelink communication based at least in part on the sensing results.

In some aspects, the UE 120 includes means for identifying, based at least in part on a packet delay budget of the sidelink communication, a number of resources available in a resource selection window associated with the cycle of the collaborative sensing schedule, wherein selecting the resources for the sidelink communication based at least in part on the sensing results is based at least in part on the number of resources available in the resource selection window associated with the cycle satisfying a threshold. In some aspects, the UE 120 includes means for performing an evaluation of the availability of the resources for the sidelink communication.

In some aspects, the UE 120 includes means for performing channel sensing to determine a channel availability for sidelink communications based at least in part on identifying that the sidelink communication is to be transmitted by the UE; and/or means for selecting the resources for the sidelink communication based at least in part on the channel availability determined by performing the channel sensing and the channel availability indicated by the sensing results. In some aspects, the UE 120 includes means for performing channel sensing for a duration that is less than a duration of sensing windows associated with the collaborative sensing schedule.

In some aspects, the UE 120 includes means for transmitting, to a sensing UE, included in the group of UEs, that is performing channel sensing in accordance with the collaborative sensing schedule, a request for sensing results based at least in part on identifying that the sidelink communication is to be transmitted by the UE; means for receiving, from the sensing UE, sensing results that indicate a channel availability for sidelink communications; and/or means for selecting the resources for the sidelink communication based at least in part on the sensing results.

In some aspects, the UE 120 includes means for identifying one or more resources associated with transmitting requests for early sharing of sensing results; and/or means for transmitting the request for sensing results using the one or more resources. In some aspects, the UE 120 includes means for transmitting the request via at least one of a sidelink control information message, a physical sidelink shared channel message, a physical sidelink feedback channel message, or an upper layer signaling message.

In some aspects, the UE 120 includes means for receiving, from the sensing UE at the next sensing results sharing opportunity, sensing results that indicate a channel availability for sidelink communications that is based at least in part on: channel sensing performed by the sensing UE prior to receiving the request for sensing results, channel sensing performed by the sensing UE after transmitting the sensing results to the UE, resources used by the sensing UE to transmit the sensing results to the UE, and the resources for the sidelink communication selected by the UE 120.

In some aspects, the UE 120 includes means for performing channel sensing to determine a channel availability for sidelink communications after transmitting the sidelink communication; and/or means for transmitting, to the group of UEs at the next sensing results sharing opportunity, sensing results that indicate a channel availability for sidelink communications that is based at least in part on: the sensing results transmitted by the sensing UE, the channel sensing performed by the UE 120, resources used by the sensing UE to transmit the sensing results to the UE 120, and the resources for the sidelink communication selected by the UE 120.

In some aspects, the UE 120 includes means for receiving, from the other UE at the next sensing results sharing opportunity, sensing results that indicate a channel availability for sidelink communications that is based at least in part on: channel sensing performed by the sensing UE prior to receiving the request for sensing results, and channel sensing performed by the other UE.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
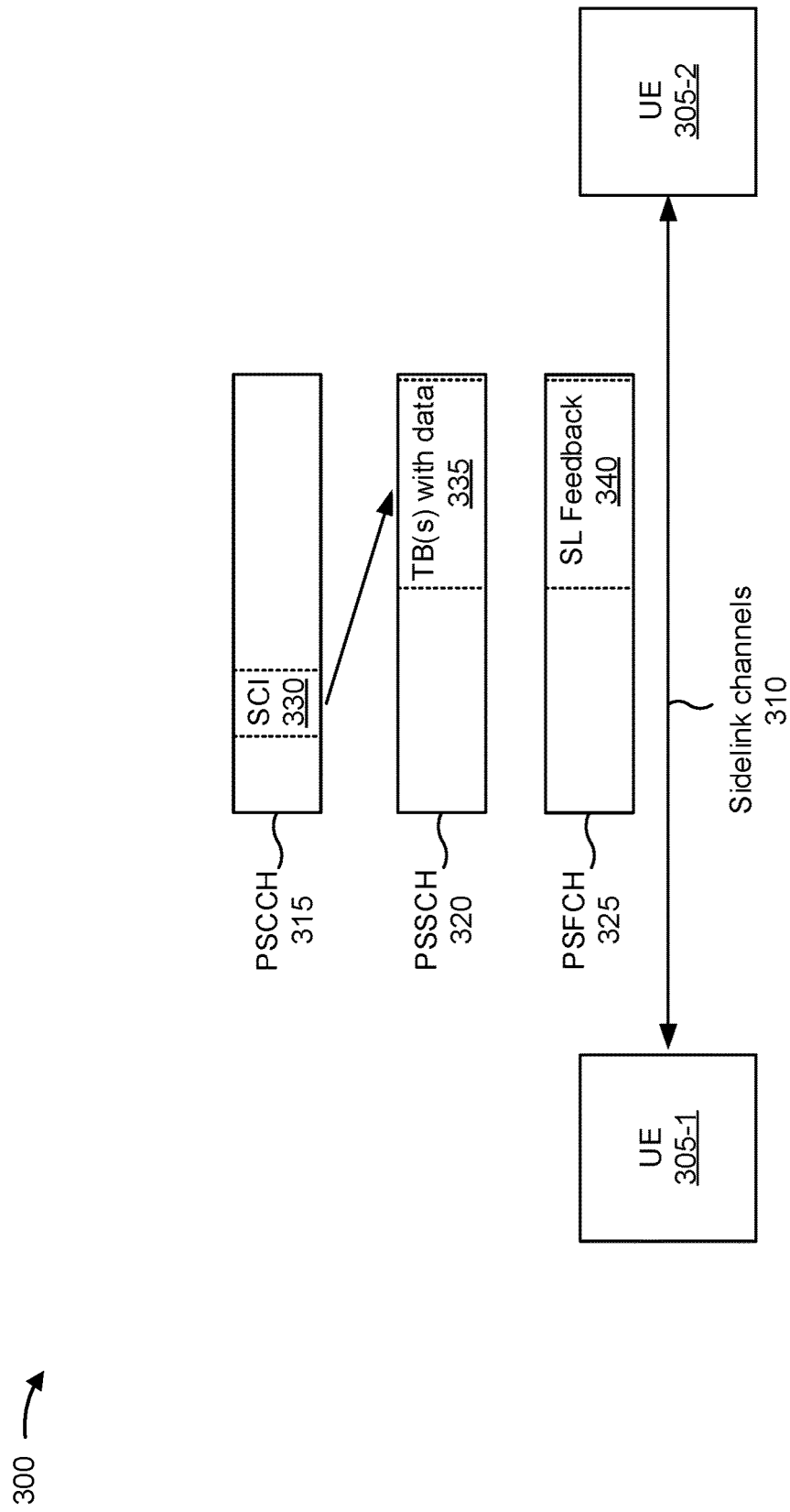
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

Figure 11:
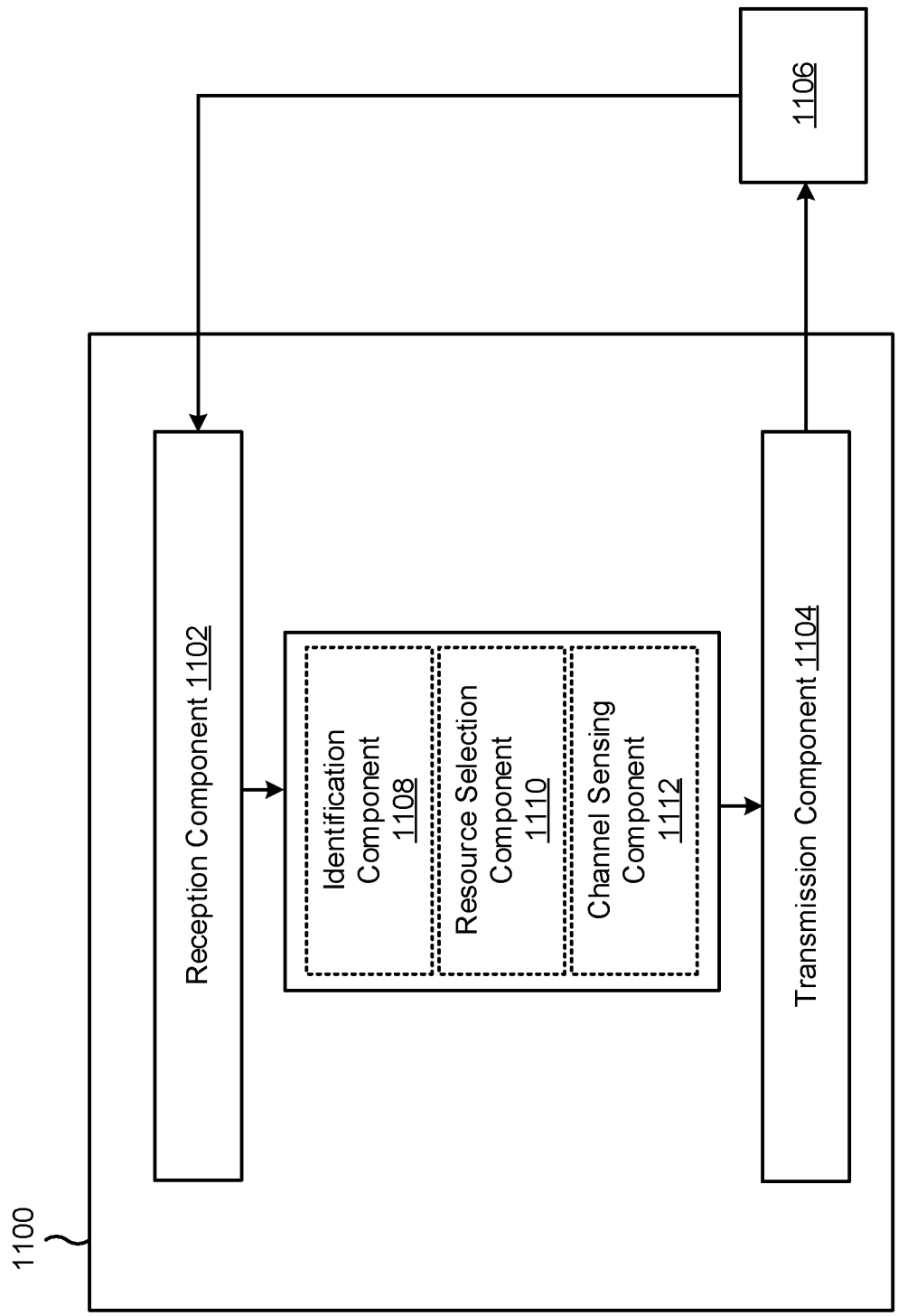
FIG. 11 is a block diagram of an example apparatus for wireless communication, in accordance with various aspects of the present disclosure.

As shown in FIG. 3, a first UE 305-1 may communicate with a second UE 305-2 (and one or more other UEs 305) via one or more sidelink channels 310 (e.g., using controller/processor 280, transmit processor 264, TX MIMO processor 266, MOD 254, antenna 252, memory 282, DEMOD 254, MIMO detector 256, receive processor 258, and/or reception component 1102 or transmission component 1104 depicted in FIG. 11). The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). A transmission mode where resource selection and/or scheduling is performed by a base station 110 may be referred to herein as a Mode 1. The transmission mode where resource selection and/or scheduling is performed by the UE 305 may be referred to herein as a Mode 2. In some aspects, the UE 305 may perform resource selection and/or scheduling by sensing channel availability for transmissions (e.g., when operating in Mode 2). For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305 (e.g., Mode 2), the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
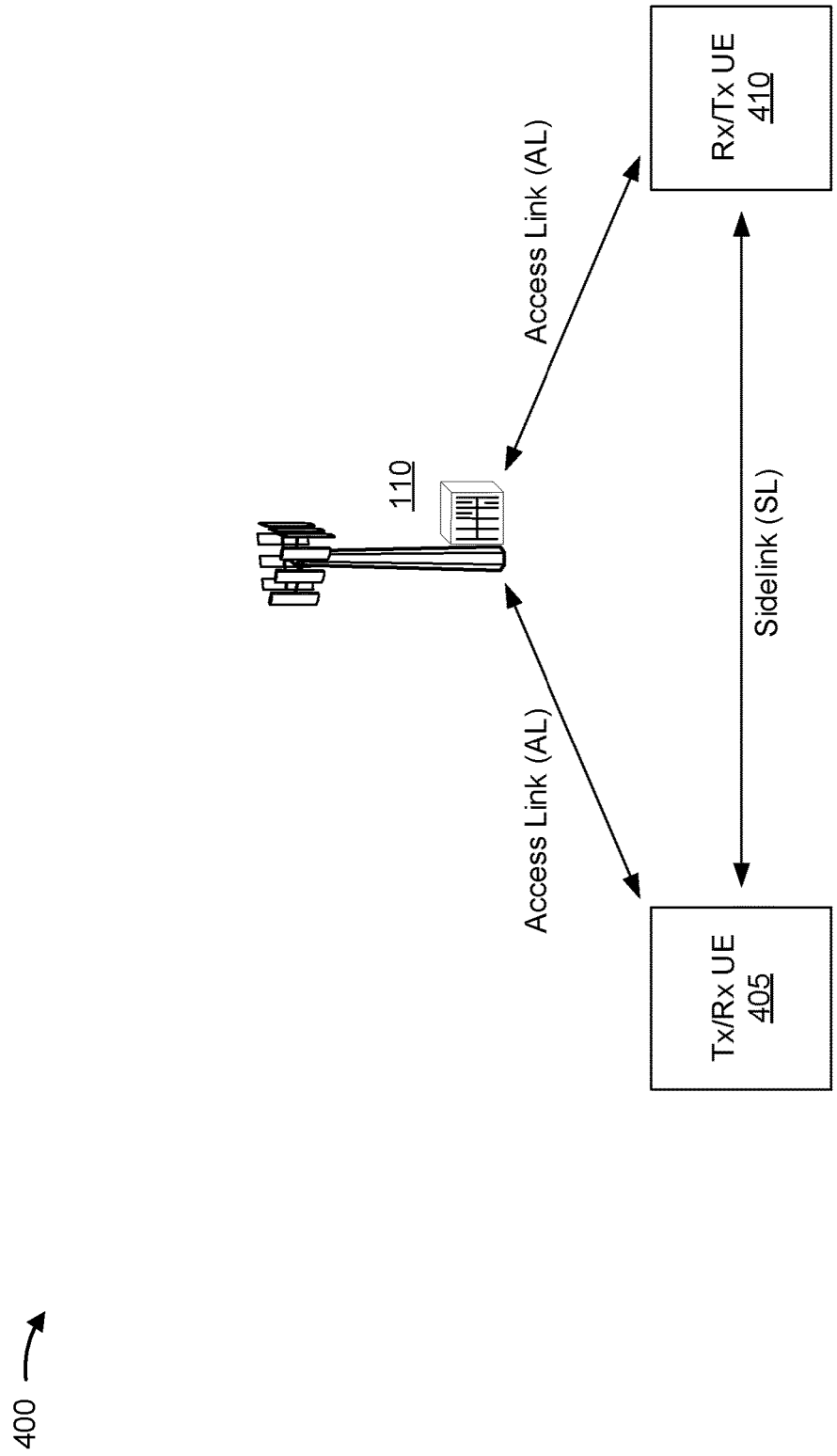
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3 (e.g., using controller/processor 280, transmit processor 264, TX MIMO processor 266, MOD 254, antenna 252, memory 282, DEMOD 254, MIMO detector 256, receive processor 258, and/or reception component 1102 or transmission component 1104 depicted in FIG. 11). As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
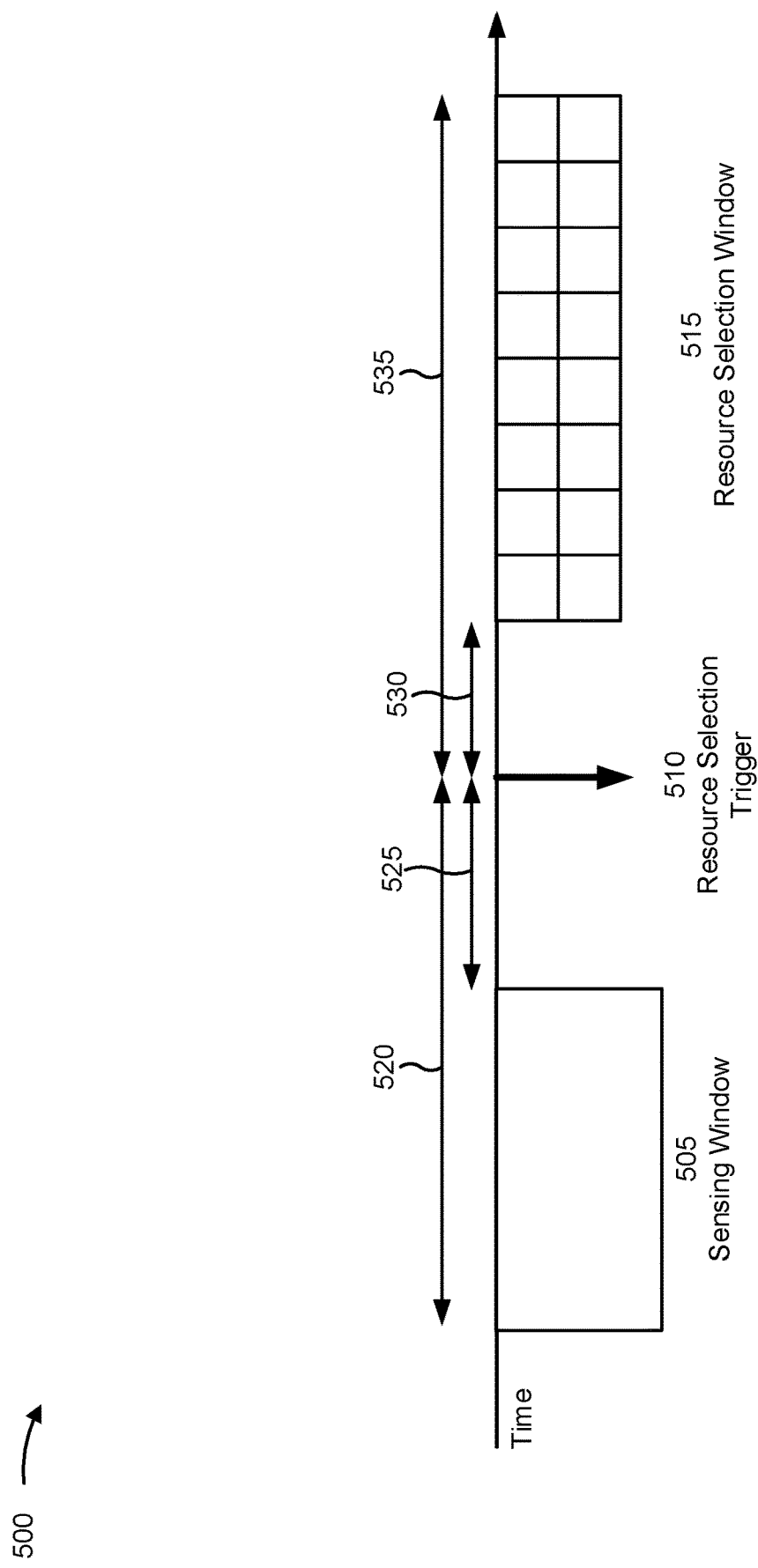
FIG. 5 is a diagram illustrating an example of resource selection for sidelink communications, in accordance with the present disclosure.

FIG. 5 is a diagram illustrating an example 500 of resource selection for sidelink communications, in accordance with the present disclosure. As shown in FIG. 5, a UE 120 may use a channel sensing procedure to select resources for sidelink communication in a Mode 2, such as described above in connection with FIG. 3.

As shown in FIG. 5, a UE 120 may perform a channel sensing procedure in a sensing window 505 (e.g., using antenna 252, DEMOD 254, MIMO detector 256, receive processor 258, controller/processor 280, memory 282, reception component 1102, and/or channel sensing component 1112 depicted in FIG. 11). In some cases, the sensing window may be 100 milliseconds (e.g., for aperiodic resource reservation, such as aperiodic reservation in one or more slots of up to 32 logical slots in the future) or 1100 milliseconds (e.g., for periodic resource reservation). In some cases, a UE 120 configured for communication in an NR network may use a sensing procedure for aperiodic or periodic resource reservation.

According to the channel sensing procedure, the UE 120 may decode control messages relating to resource reservations of other UEs 120, as well as perform measurements (e.g., RSRP measurements and/or RSSI measurements, among other examples) associated with one or more sidelink channels (e.g., using antenna 252, DEMOD 254, MIMO detector 256, receive processor 258, controller/processor 280, memory 282, and/or reception component 1102 depicted in FIG. 11). For example, the other UEs 120 may transmit reservation information (e.g., in SCI) that indicates a resource reservation for a current slot (e.g., the slot in which the reservation information is transmitted) and for one or more (e.g., up to two) future slots. The UE 120 may monitor for and decode the reservation information during the sensing window 505 to determine a channel availability (e.g., to determine available resources) of the sidelink channel. The channel sensing may be performed by a physical (PHY) layer of the UE 120. The PHY layer may generate a report of the channel sensing (e.g., of resources that are occupied or reserved based at least in part on the measurements and/or sensing performed at the PHY layer). The PHY layer may provide the report to a medium access control (MAC) layer of the UE 120. The MAC layer may determine available resources for a resource selection window, as described in more detail below, based at least in part on the report from the PHY layer.

As shown in FIG. 5, the UE 120 may determine to select resources for a sidelink communication based at least in part on a resource selection trigger 510 (e.g., using controller/processor 280 and/or memory 282). For example, resource selection may be triggered when the UE 120 has a packet that is to be transmitted or when the UE 120 receives an indication to select (or reselect) resources for a packet that is to be transmitted by the UE 120. Based at least in part on the resource selection trigger 510, the UE 120 may determine one or more resources that are available for selection in a resource selection window 515. That is, the UE 120 may determine the one or more available resources based at least in part on the channel sensing procedure performed by the UE 120. For example, the channel sensing procedure may provide an indication of resources in the resource selection window 515 that are occupied and/or resources in the resource selection window 515 associated with high interference.

The sensing window 505 may be based at least in part on a timing associated with the resource selection trigger 510. For example, as shown by reference number 520, the sensing window may begin at a time $T_0$ from the resource selection trigger 510. As shown by reference number 525, the sensing window 505 may end at a time $T_{proc,0}$ from the resource selection trigger 510. $T_{proc,0}$ may be based at least in part on a processing time associated with the UE 120. In other words, the UE 120 may continually perform channel sensing associated with the sidelink channel described above. When the UE 120 is triggered to select resources for a sidelink communication, the UE 120 may consider reservation information and/or measurements associated with the channel sensing procedure that were received and/or performed during the channel sensing window 505.

As shown by reference numbers 530 and 535, if a resource selection trigger 510 occurs at a time n, the resource selection window 515 may be from $n+T_1$ to $n+T_2$. In some aspects, $T_1$ may be less than a processing time ($T_{proc,1}$) associated with the UE 120. In some aspects, $T_2$ may be greater than or equal to $T_{2,min}$, which may be a value configured for the UE based at least in part on a priority of the UE 120, and less than or equal to a remaining packet delay budget (PDB) of the packet to be transmitted by the UE 120. A PDB is a constraint indicating a maximum allowable delay between a time of packet arrival (e.g., at a UE) and a time of a last transmission of the packet.

As described above, the UE 120 may continually perform channel sensing, as described above, until the UE 120 has a packet to transmit (e.g., until the UE 120 detects a resource selection trigger). As a result, the UE 120 may consume significant resources (e.g., power resources, processing resources, and/or network resources) associated with channel sensing while operating in a Mode 2 operating mode.

As indicated above, FIG. 5 is provided as an example. Other examples may differ from what is described with respect to FIG. 5.

Figure 6:
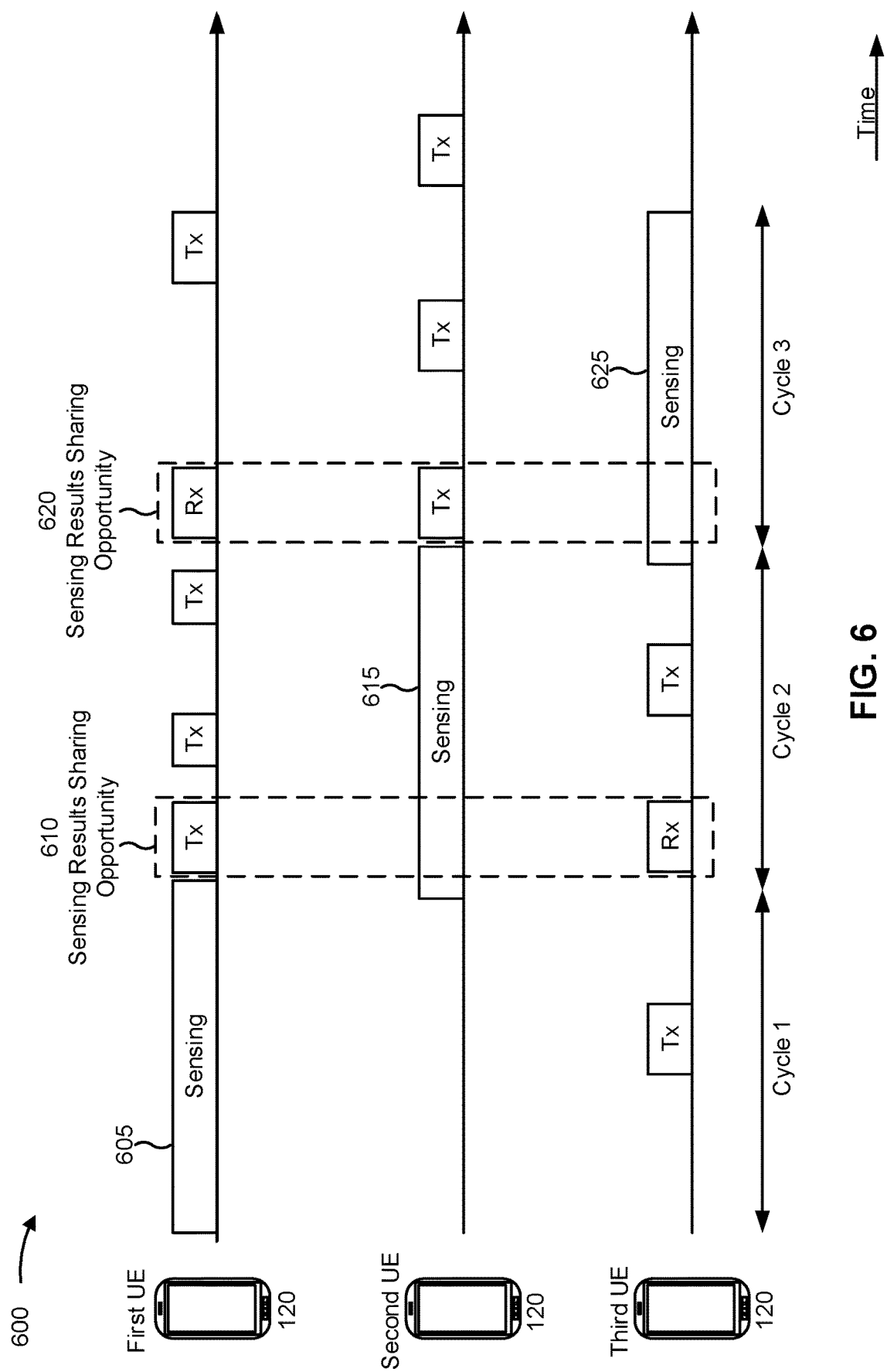
FIG. 6 is a diagram illustrating an example of a collaborative sensing schedule, in accordance with the present disclosure.

FIG. 6 is a diagram illustrating an example 600 of a collaborative sensing schedule, in accordance with the present disclosure. As described above, a UE 120 operating in a Mode 2 operating mode (e.g., where resource selection and/or scheduling is performed by the UE 120, rather than a base station 110). While operating in the Mode 2 operating mode, the UE 120 may continually perform channel sensing until the UE 120 identifies a packet to be transmitted by the UE 120. However, in some cases, some UEs 120 may be experiencing or sensing similar channel conditions or availability. For example, a group of UEs 120 may be located proximate to one another, such that the UEs 120 may sense the same or a similar channel availability. Therefore, the group of UEs may coordinate a collaborative sensing schedule, as described in more detail below, to conserve resources (e.g., power resources, processing resources, and/or network resources) that would have otherwise been used by each UE 120 included in the group continually perform channel sensing (e.g., in a similar manner as described above in connection with FIG. 5). For example, as described in more detail below, the group of UEs 120 may determine a collaborative sensing schedule with a set of cycles, such that only one UE 120 in the group (or a subset of UEs 120 in the group) is required to perform channel sensing during a cycle. Therefore, a power overhead associated with channel sensing for a UE 120 may be reduced by approximately 1/N, where N is the number of UEs 120 included in the group.

As shown in FIG. 6, the group of UEs may include three UEs (e.g., a first UE 120, a second UE 120, and a third UE 120). The UEs 120 may exchange messages (e.g., sidelink messages and/or SCI) to determine the collaborative sensing schedule (e.g., using controller/processor 280, transmit processor 264, TX MIMO processor 266, MOD 254, antenna 252, memory 282, DEMOD 254, MIMO detector 256, receive processor 258, reception component 1102 and/or transmission component 1104 depicted in FIG. 11). For example, the UEs 120 may negotiate a length of sensing windows for cycles of the collaborative sensing schedule. For example, for a cycle of the collaborative sensing schedule, a UE 120 (e.g., the first UE 120, the second UE 120, or the third UE 120) may perform channel sensing during a sensing window. The length or duration of the sensing window may be negotiated between the UEs 120. For example, the length or duration of the sensing window may be different than the 100 millisecond (e.g., for aperiodic resource reservation) or 1100 millisecond (e.g., for periodic resource reservation) sensing window duration described above in connection with FIG. 5. The sensing window and the cycle may have substantially the same duration.

In some aspects, when determining the collaborative sensing schedule, the UEs 120 may determine a resource selection window length or duration (e.g., using controller/processor 280 and/or memory 282). For example, each sensing window (e.g., each cycle) of the collaborative sensing schedule may be associated with a corresponding resource selection window. That is, after performing channel sensing during a sensing window, the UE 120 that has performed the sensing (e.g., the sensing UE) may share the results of the channel sensing with all other UEs 120 included in the group. If the other UEs 120 in the group (and/or the sensing UE) have packets to transmit, the UEs 120 may select resources from a resource selection window corresponding to the sensing window and/or the cycle. The length or duration of a resource selection window may be a fixed value or may be negotiated among the UEs 120 in the group. In some aspects, the length or duration of a resource selection window may be negotiated to be independent of a PDB, as a PDB of a packet to be transmitted by one UE 120 in the group may unknown to other UEs 120 in the group. In some aspects, the length or duration of a resource selection window may be based at least in part on a length or duration required to support aperiodic reservation in one or more slots of up to 32 logical slots in the future.

In some aspects, the collaborative sensing schedule may include sensing windows, or cycles, that at least partially overlap in the time domain. For example, prior to a first sensing window ending, a next sensing window in the collaborative sensing schedule may begin such that at any time at least one UE 120 in the group is performing channel sensing (e.g., to ensure that no reservations or SCI are missed by the UEs 120 due to gaps in channel sensing). In some aspects, the resource selection windows of the collaborative sensing schedule may be continuous (e.g., the resource selection windows may at least partially overlap in the time domain in a similar manner as described above in connection with the sensing windows) or may be discontinuous.

As shown by reference number 605, during a first cycle (e.g., cycle 1), the first UE 120 may perform channel sensing during a sensing window according to the collaborative sensing schedule (e.g., using antenna 252, DEMOD 254, MIMO detector 256, receive processor 258, controller/processor 280, memory 282, and/or channel sensing component 1112). The channel sensing may be based at least in part on RSRP measurements and/or may be based at least in part on SCI received by the first UE 120 to determine a number of available resources available in the resource selection window corresponding to the first cycle. As shown in FIG. 6, during the first cycle, the second UE 120 and the third UE 120 may not be performing channel sensing (e.g., may be non-sensing UEs). As used herein, a "sensing UE" may refer to a UE 120 that is currently performing channel sensing according to the collaborative sensing schedule. A "non-sensing UE" may refer to a UE 120 that is not currently performing channel sensing according to the collaborative sensing schedule. The non-sensing UEs may be in a transmit mode during the first cycle (e.g., may be transmitting one or more sidelink communications or packets). In some aspects, a non-sensing UE may enter a sleep mode or an idle mode (e.g., when the non-sensing UE does not have any packets to transmit) to enable the non-sensing UE to conserve power resources.

As shown by reference number 610, at the end of the first cycle or after the sensing window, a sensing results sharing opportunity may occur. A "sensing results sharing opportunity" may refer to a point in time at which a sensing UE is scheduled to share sensing results (e.g., to share an indication of a channel availability) according to the collaborative sensing schedule. For example, a sensing results sharing opportunity may occur at the end of a cycle or at the end of a sensing window (or shortly thereafter). The first UE 120 (e.g., the sensing UE during the first cycle) may share sensing results obtained based at least in part on performing the channel sensing. The sensing results may indicate a report for all resources included in the resource selection window corresponding to the first cycle (e.g., may indicate whether each resource in the resource selection window is available or reserved). In some aspects, the sensing results may indicate only the reserved resources included in the resource selection window corresponding to the first cycle. In some aspects, the sensing results may indicate only the available resources included in the resource selection window corresponding to the first cycle. In some aspects, the sensing results may indicate a combination of reserved resources and available resources included in the resource selection window corresponding to the first cycle. As shown in FIG. 6, the second UE 120 and the third UE 120 may receive the sensing results from the first UE 120 (e.g., using antenna 252, DEMOD 254, MIMO detector 256, receive processor 258, controller/processor 280, memory 282, and/or reception component 1102). If the second UE 120 or the third UE 120 has a packet to transmit, the second UE 120 or the third UE 120 may select resources for the packet from the resource selection window (e.g., based at least in part on the sensing results).

As shown by reference number 615, during a second cycle (e.g., cycle 2), the second UE 120 may perform channel sensing during a sensing window according to the collaborative sensing schedule (e.g., using antenna 252, DEMOD 254, MIMO detector 256, receive processor 258, controller/processor 280, memory 282, and/or channel sensing component 1112). That is, during the second cycle, the second UE 120 may be a sensing UE. The second UE 120 may perform channel sensing in a similar manner as described above in connection with the first UE 120 and the first cycle. As shown in FIG. 6, and as described above, the sensing window of the second cycle may at least partially overlap in the time domain with the sensing window of the first cycle. As shown by reference number 620, at the end of the second cycle or after the sensing window, a sensing results sharing opportunity may occur. The second UE 120 may transmit, to the first UE 120 and the third UE 120, sensing results obtained by the second UE 120 based at least in part on performing the channel sensing. The second UE 120 may transmit the sensing results in a similar manner as described above in connection with the first UE 120 and the first cycle.

As shown by reference number 625, during a third cycle (e.g., cycle 3), the third UE 120 may perform channel sensing during a sensing window according to the collaborative sensing schedule (e.g., using antenna 252, DEMOD 254, MIMO detector 256, receive processor 258, controller/processor 280, memory 282, and/or channel sensing component 1112). That is, during the third cycle, the third UE 120 may be a sensing UE. The collaborative sensing schedule may proceed in a similar manner as described above to enable the UEs 120 included in the group to share a burden or power overhead associated with channel sensing while operating in a Mode 2 operating mode in a sidelink environment. For example, the third UE 120 may transmit sensing results at a sensing results sharing opportunity. During a fourth cycle (e.g., after the third cycle, not shown in FIG. 6), the first UE 120 may perform channel sensing during a sensing window according to the collaborative sensing schedule. In this way, a power overhead associated with channel sensing for a UE 120 may be reduced by approximately 1/N, where N is the number of UEs 120 included in the group.

However, in some cases, a non-sensing UE may identify an urgent packet to be transmitted by the non-sensing UE. For example, during a cycle of the collaborative sensing schedule, a non-sensing UE may identify or receive a packet to be transmitted by the non-sensing UE that must be transmitted prior to a next sensing results sharing opportunity, a next transmission opportunity, and/or a next resource selection window according to collaborative sensing schedule. For example, the urgent packet may be a packet that has a PDB that expires prior to the next sensing results sharing opportunity, the next transmission opportunity, and/or the next resource selection window according to collaborative sensing schedule. Therefore, the non-sensing UE may be unable to transmit the urgent packet in time to satisfy the PDB of the urgent packet. Failing to satisfy the PDB of a packet may result in the packet being dropped, thereby degrading communication performance of the UE.

Some techniques and apparatuses described herein enable early sharing for collaborative sensing in a sidelink environment. For example, a UE 120 may identify a sidelink communication (e.g., a packet) that is to be transmitted by the UE 120 before a next sensing results sharing opportunity, a next transmission opportunity, and/or a next resource selection window according to a collaborative sensing schedule. In some aspects, the UE 120 may select resources for the sidelink communication based at least in part on sensing results received from a most recent cycle of the collaborative sensing schedule.

In some aspects, the UE 120 may perform channel sensing and may use the sensing results received from a most recent cycle of the collaborative sensing schedule in combination with the channel sensing performed by the UE 120 to select resources for the sidelink communication. In some aspects, the UE 120 may trigger an early sharing of sensing results from a sensing UE of the cycle during which the sidelink communication is to be transmitted by the UE 120. The sensing UE 120 may share sensing results obtained by the sensing UE based at least in part on performing channel sensing up to the point at which the UE 120 requested early sharing of sensing results. The UE 120 may select resources for the sidelink communication based at least in part on the sensing results shared by the sensing UE.

In some aspects, a technique or operation used by the UE 120 to select resources for the sidelink communication (e.g., using sensing results from a previous cycle, performing sensing, and/or requesting early sharing of sensing results) may be based at least in part on a time at which the urgent packet (e.g., the sidelink communication) arrives at the UE 120 and/or is to be transmitted by the UE 120. As a result, the UE 120 is enabled to transmit urgent traffic (e.g., urgent packets and/or sidelink communications) while operating according to a collaborative sensing schedule. This improves communication performance of the UE 120 by ensuring that the UE 120 is enabled to transmit packets prior to a PDB of the packet expiring when the UE 120 is operating according to a collaborative sensing schedule.

As indicated above, FIG. 6 is provided as an example. Other examples may differ from what is described with respect to FIG. 6.

Figure 7:
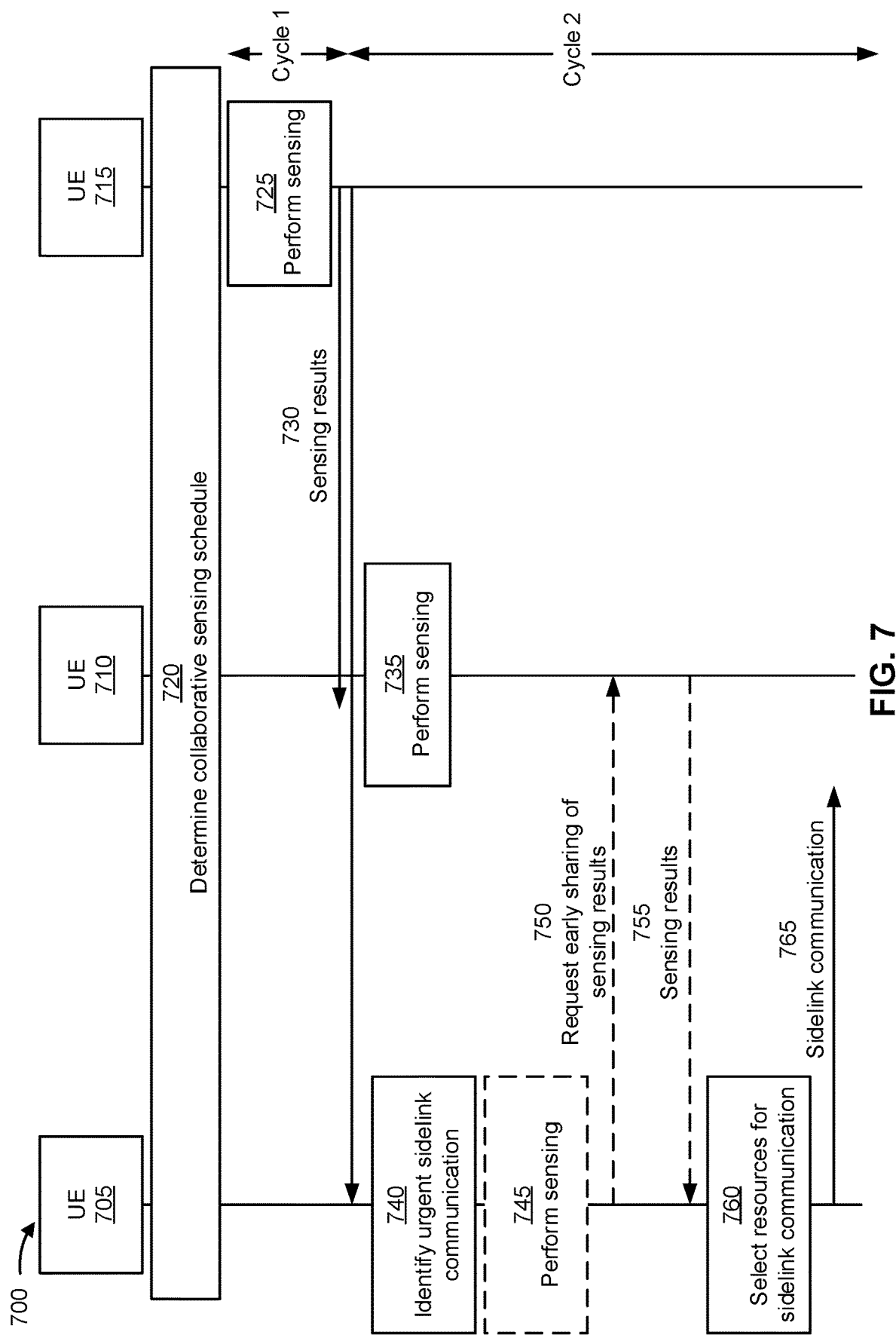
FIGS. 7-9 are diagrams illustrating examples associated with early sharing for collaborative sensing in sidelink, in accordance with various aspects of the present disclosure.

FIG. 7 is a diagram illustrating an example 700 associated with early sharing for collaborative sensing in sidelink, in accordance with various aspects of the present disclosure. As shown in FIG. 7, a UE 705, a UE 710, and a UE 715 may communicate with one another in a wireless network, such as wireless network 100 and/or the sidelink environment described above in connection with FIGS. 3 and 4.

As show by reference number 720, the UE 705, the UE 710, and the UE 715 may communicate to determine a collaborative sensing schedule (e.g., using controller/processor 280, transmit processor 264, TX MIMO processor 266, MOD 254, antenna 252, memory 282, DEMOD 254, MIMO detector 256, receive processor 258, reception component 1102 and/or transmission component 1104 depicted in FIG. 11). For example, the UE 705, the UE 710, and the UE 715 may exchange one or more messages to determine and/or negotiate the collaborative sensing schedule and/or related parameters. The UE 705, the UE 710, and the UE 715 may exchange one or more messages to determine and/or negotiate the collaborative sensing schedule and/or related parameters when establishing the group that includes the UE 705, the UE 710, and the UE 715. The collaborative sensing schedule may be similar to (or the same as) the collaborative sensing schedule described above in connection with FIG. 6. For example, the UE 705, the UE 710, and the UE 715 may communicate to determine and/or negotiate a sensing window length, a cycle length, a resource selection window length, and/or an order (e.g., an order in which the UEs are to perform sensing), among other examples, for the collaborative sensing schedule. In some aspects, the UE 705, the UE 710, and the UE 715 may exchange messages to configure resources and/or opportunities (e.g., a number of opportunities to transmit a request for early sharing for each UE in the group and/or a number of opportunities to transmit a request for early sharing for each traffic priority level) for transmitting a request for early sharing of sensing results, as explained in more detail below.

As shown by reference number 725, during a first cycle (e.g., cycle 1) of the collaborative sensing schedule, the UE 715 may perform channel sensing during a sensing window associated with the first cycle (e.g., using antenna 252, DEMOD 254, MIMO detector 256, receive processor 258, controller/processor 280, memory 282, and/or channel sensing component 1112). The UE 715 may perform channel sensing during the sensing window in a similar manner as described above in connection with FIGS. 5 and 6. As shown by reference number 730, at a sensing results sharing opportunity associated with the first cycle, the UE 715 may transmit, to the UE 705 and the UE 710, sensing results obtained by the UE 715 based at least in part on performing the channel sensing, as described above.

The UE 715 may transmit the sensing results in a similar manner as described above in connection with FIG. 6 (e.g., using controller/processor 280, transmit processor 264, TX MIMO processor 266, MOD 254, antenna 252, memory 282, and/or transmission component 1104). In some aspects, the UE 715 may transmit dedicated messages to the UE 705 and the UE 710 indicating the sensing results. In some aspects, the UE 715 may transmit a broadcast message indicating the sensing results that the UE 705 and the UE 710 are enabled to receive according to the collaborative sensing schedule.

As shown by reference number 735, during a second cycle (e.g., cycle 2) of the collaborative sensing schedule, the UE 710 may perform channel sensing during a sensing window associated with the second cycle (e.g., using antenna 252, DEMOD 254, MIMO detector 256, receive processor 258, controller/processor 280, memory 282, and/or channel sensing component 1112). The UE 710 may perform channel sensing during the sensing window in a similar manner as described above in connection with FIGS. 5 and 6. Therefore, during the second cycle, the UE 710 may be a sensing UE. Similarly, during the second cycle, the UE 705 and the UE 715 may be non-sensing UEs.

As shown by reference number 740, the UE 705 may identify, during the second cycle, an urgent sidelink communication that is to be transmitted by the UE 705 (e.g., using controller/processor 280, memory 282, and/or identification component 1108 depicted in FIG. 11). An urgent sidelink communication may be a sidelink communication that is to be transmitted by the UE 120 prior to a next sensing results sharing opportunity, a next transmission opportunity, and/or a next resource selection window according to a collaborative sensing schedule. For example, the UE 705 may identify that a packet (e.g., associated with the sidelink communication) has a PDB that expires prior to a next sensing results sharing opportunity, a next transmission opportunity, and/or a next resource selection window according to a collaborative sensing schedule. Therefore, the UE 705 may determine that the UE 705 cannot wait until receiving sensing results associated with the second cycle (e.g., from the UE 710) and/or until a resource selection window associated with the second cycle before transmitting the sidelink communication.

The UE 705 may select resources for the sidelink communication according to one or more different options (e.g., using controller/processor 280 memory 282, and/or resource selection component 1110 depicted in FIG. 11). For example, according to a first option, the UE 705 may select resources for the sidelink communication based at least in part on the sensing results associated with the previous cycle (e.g., the first cycle sensing results received from the UE 715) of the collaborative sensing schedule. The first option may be referred to herein as option 1. The UE 705 may select resources according to option 1 if the packet arrival time (e.g., the resource selection trigger) and/or the PDB of the sidelink communication are within the resource selection window associated with the previous cycle (e.g., the first cycle), as depicted and described in more detail below in connection with FIG. 8. In some aspects, the UE 705 may select resources according to option 1 based at least in part on the collaborative sensing schedule being associated with continuous resource selection windows (e.g., where there are no gaps in time between resource selection windows of the collaborative sensing schedule).

In some aspects, the UE 705 may select resources for the sidelink communication according to option 1 based at least in part on a number of available resources for the sidelink communication in the resource selection window associated with the previous cycle. For example, the UE 705 may identify, based at least in part on the PDB of the sidelink communication, a number of available resources for the sidelink communication in the resource selection window associated with the previous cycle. The UE 705 may determine whether the number of available resources for the sidelink communication in the resource selection window associated with the previous cycle satisfies a threshold. If the number of available resources for the sidelink communication in the resource selection window associated with the previous cycle satisfies the threshold, then the UE 705 may select resources for the sidelink communication according to option 1. If the number of available resources for the sidelink communication in the resource selection window associated with the previous cycle does not satisfy the threshold, then the UE 705 may not select resources for the sidelink communication according to option 1.

As shown by reference number 745, in some aspects, the UE 705 may select resources for the sidelink communication according to a second option based at least in part on performing channel sensing during the second cycle (e.g., using antenna 252, DEMOD 254, MIMO detector 256, receive processor 258, controller/processor 280, memory 282, and/or channel sensing component 1112). The second option may be referred to herein as option 2. The channel sensing performed by the UE 705 may be shortened channel sensing. For example, the UE 705 may perform channel sensing during a sensing window that has a duration that is less than a duration of the sensing windows associated with the collaborative sensing schedule. In some aspects, the length of duration of the sensing window for the UE 705 may be based at least in part on a PDB of the sidelink communication that is to be transmitted by the UE 705 (e.g., the UE 705 may perform channel sensing such that the UE 705 is still able to transmit the sidelink communication prior to the PDB expiring), a number of available resources indicated in the previous sensing results (e.g., the first cycle sensing results received from the UE 715), and/or an amount of time since receiving the previous sensing results (e.g., if the previous sensing results are older or outdated, the duration of the sensing window for the UE 705 may be longer).

The UE 705 may determine a channel availability (e.g., may determine sensing results) based at least in part on performing channel sensing during the second cycle, as described above. According to option 2, the UE 705 may select resources for the sidelink communication based at least in part on the sensing results obtained from performing the channel sensing and based at least in part on the sensing results associated with the previous cycle (e.g., the first cycle sensing results received from the UE 715). That is, the UE 705 may combine the sensing results obtained by the UE 705 with the sensing results received from the UE 715 to determine a channel availability and/or available resources for the sidelink communication.

The UE 705 may select resources for the sidelink communication according to option 2 based at least in part on the packet arrival time (e.g., the resource selection trigger) and/or the PDB of the sidelink communication being outside of the resource selection window associated with the previous cycle (e.g., the first cycle), as depicted and described in more detail below in connection with FIG. 8. In some aspects, the UE 705 may select resources for the sidelink communication according to option 2 based at least in part on the PDB of the sidelink communication expiring prior to (or expiring a threshold amount of time prior to) a resource selection window associated with the current cycle (e.g., the second cycle).

As shown by reference numbers 750 and 755, in some aspects, the UE 705 may select resources for the sidelink communication according to a third option based at least in part on triggering early sharing of sensing results from the sensing UE associated with the current cycle (e.g., the UE 710 during the second cycle). The third option may be referred to herein as option 3. For example, as shown by reference number 750, the UE 705 may transmit, to the UE 710, a request for sensing results based at least in part on identifying the urgent sidelink communication (e.g., using controller/processor 280, transmit processor 264, TX MIMO processor 266, MOD 254, antenna 252, memory 282, and/or transmission component 1104 depicted in FIG. 11). The UE 710 may receive the request for the sensing results and may stop or cease the channel sensing (e.g., that was being performed by the UE 710 according to the collaborative sensing schedule). As shown by reference number 755, the UE 710 may transmit, to the UE 705, an indication of sensing results that are based at least in part on channel sensing performed by the UE 710 during the second cycle up to the point at which the request for the sensing results was received from the UE 705 (e.g., using controller/processor 280, transmit processor 264, TX MIMO processor 266, MOD 254, antenna 252, memory 282, and/or transmission component 1104 depicted in FIG. 11).

The resources used by the UE 705 to transmit the request for the sensing results may be reserved resources for requests for sensing results. That is, the collaborative sensing schedule may be associated with one or more resources (e.g., in a sensing cycle) that are reserved for requests for early sharing of sensing results. The one or more resources that are reserved for requests for early sharing of sensing results may be negotiated and/or updated between the UEs in the group according to the collaborative sensing schedule. In some aspects, another non-sensing UE may transmit a message (e.g., SCI) to reserve at least one resource in the one or more resources. The UE 705 may identify resources reserved for early sharing of sensing results (e.g., during the second cycle) and may use the identified resources to transmit the request for the sensing results to the UE 710. In some aspects, a use of the identified resources by the UE 705 (and/or other UEs in the group) may be negotiated between the UEs in the group. For example, the UE 705 may be configured with a number of times that the UE 705 can transmit requests for early sharing. In some aspects, the UE 705 may be configured with certain occasions (e.g., associated with the identified resources) during which the UE 705 is permitted to transmit requests for early sharing.

In some aspects, after the UE 710 transmits the sensing results to the UE 705, the UE 710 may resume sensing according to the collaborative sensing schedule. When transmitting the sensing results for the second cycle (e.g., at the sensing results sharing opportunity associated with the second cycle), the UE 710 may indicate that sensing was interrupted (e.g., due to the early sharing of sensing results). The sensing results shared by the UE 710 at the end of the second cycle may be based at least in part on the sensing results obtained via channel sensing performed by the UE 710 during the second cycle up to the point at which the request for the sensing results was received from the UE 705, sensing results obtained via channel sensing performed by the UE 710 during the second cycle after transmitting the sensing results to the UE 705, the resources used by the UE 710 to transmit the sensing results to the UE 705, and the resources used by the UE 705 to transmit the urgent sidelink communication. In some aspects, the UE 705 may begin channel sensing for the second cycle after transmitting the urgent sidelink communication (e.g., rather than the UE 710 resuming channel sensing). In some aspects, the UE 710 may wake up another UE (e.g., the UE 715) and indicate that the other UE is to perform channel sensing for the remainder of the second cycle. In some aspects, resources used to transmit a signal to wake up the other UE may be configured and/or negotiated, similar to the resources for transmitting request for early sharing of sensing results described above. For example, a UE may be configured to monitor for wake up signals during certain occasions (e.g., in certain resources). The group of UEs may configure and/or negotiate the resources and/or occasions to be used to transmit a signal to wake up other UEs via RRC signaling (e.g., via groupcast signaling) Option 3 is depicted and described in more detail below in connection with FIG. 9.

As shown by reference number 760, the UE 705 may select resources for the sidelink communication (e.g., the urgent sidelink communication) according to option 1 (e.g., a random selection based on sensing results from the previous cycle of the collaborative sensing schedule), option 2 (e.g., performing shortened channel sensing combined with the sensing results from the previous cycle of the collaborative sensing schedule), or option 3 (e.g., requesting and receiving early sharing results from the sensing UE during the cycle of the collaborative sensing schedule). For example, the UE 705 may select the resources for the sidelink communication from a resource selection window that indicates available resources (e.g., based at least in part on performing option 1, option 2, or option 3).

As shown by reference number 765, the UE 705 may transmit the sidelink communication (e.g., the urgent sidelink communication) using the resource selected by the UE 705, as described above (e.g., using controller/processor 280, transmit processor 264, TX MIMO processor 266, MOD 254, antenna 252, memory 282, and/or transmission component 1104 depicted in FIG. 11). For example, the UE 705 may transmit the sidelink communication during the second cycle (e.g., before a next sensing results sharing opportunity, a next transmission opportunity, and/or a next resource selection window according to a collaborative sensing schedule). The UE 705 may transmit the sidelink communication to the UE 710, the UE 715, another UE (e.g., not shown in FIG. 7), or another device (e.g., a roadside unit or another device in the sidelink environment), among other examples.

Any non-sensing UE in the group of UEs associated with the collaborative sensing schedule may select resources for urgent communications in a similar manner as described herein. For example, the UE 715 may select resources for an urgent sidelink communication during the second cycle in a similar manner as described herein. As a result, the UE 705 is enabled to transmit urgent traffic (e.g., urgent packets and/or sidelink communications) while operating according to a collaborative sensing schedule. This improves communication performance of the UE 705 by ensuring that the UE 705 is enabled to transmit packets prior to a PDB of the packet expiring when the UE 705 is operating according to a collaborative sensing schedule.

As indicated above, FIG. 7 is provided as an example. Other examples may differ from what is described with respect to FIG. 7.

Figure 8:
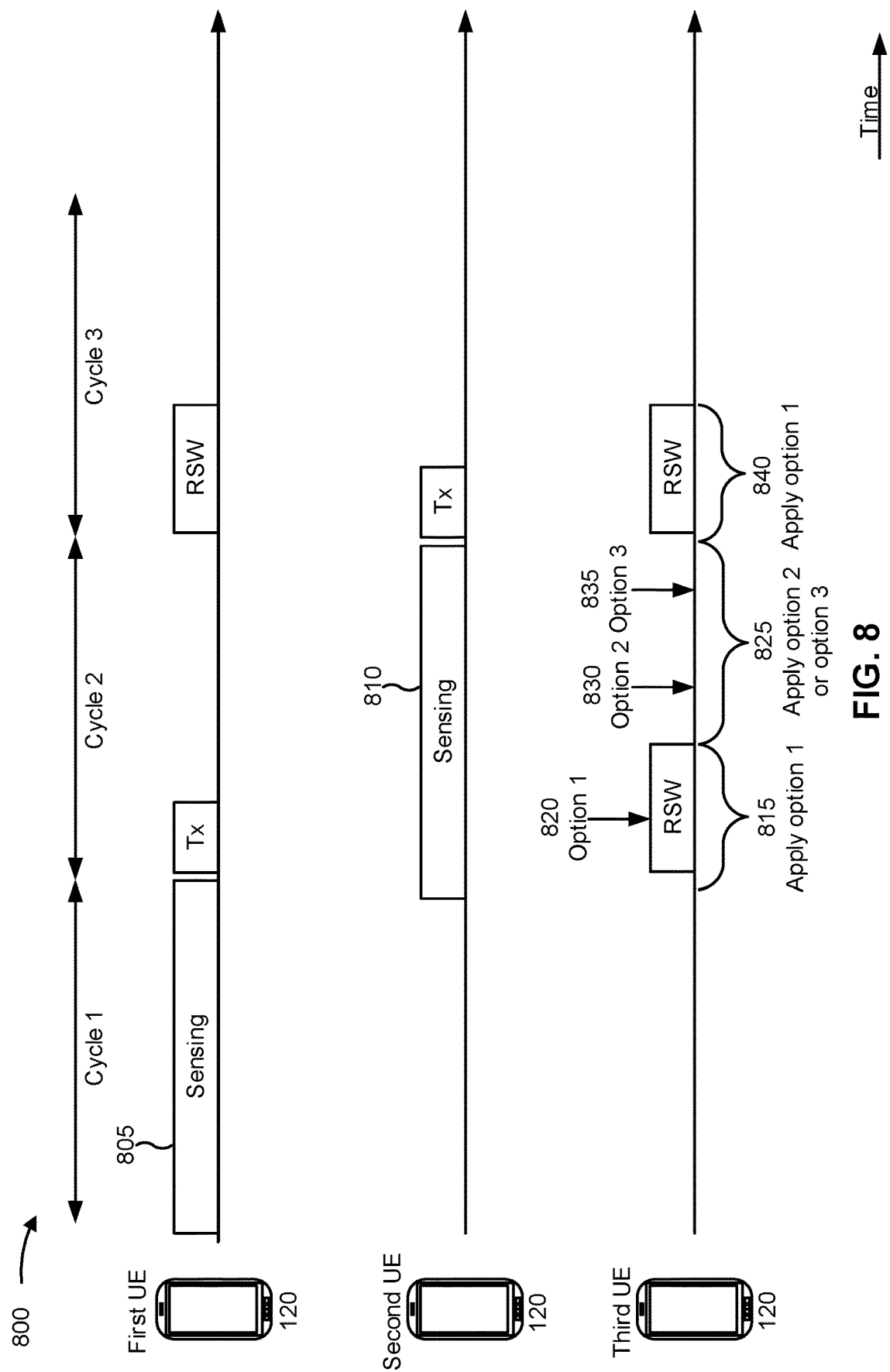

FIG. 8 is a diagram illustrating an example 800 associated with early sharing for collaborative sensing in sidelink, in accordance with various aspects of the present disclosure. As shown in FIG. 8, a first UE 120, a second UE 120, and a third UE 120 may communicate with one another in a wireless network, such as wireless network 100 and/or the sidelink environment described above in connection with FIGS. 3 and 4.

The first UE 120, the second UE 120, and the third UE 120 may communicate with one another to determine a collaborative sensing schedule, as described above in connection with FIGS. 6 and 7. For example, as shown by reference number 805, the first UE 120 may perform channel sensing during a sensing window in a first cycle (e.g., cycle 1) according to the collaborative sensing schedule. As shown by reference number 810, the second UE 120 may perform channel sensing during a sensing window in a second cycle (e.g., cycle 2) according to the collaborative sensing schedule. In some cases, during the second cycle as shown in FIG. 8 (or during another cycle), the third UE 120 may identify an urgent communication (e.g., an urgent packet or urgent traffic) that is to be transmitted by the third UE 120 prior to a next sensing results sharing opportunity, a next transmission opportunity, and/or a next resource selection window according to collaborative sensing schedule (e.g., as described above in more detail in connection with FIG. 7).

The third UE 120 may select resources for the urgent communication using one or more options or techniques, such as option 1, option 2, and/or option 3 described above in connection with FIG. 7. In some aspects, the third UE 120 may determine an option or technique to use to select resources for the urgent communication based at least in part on a timing of identifying the urgent communication. For example, the third UE 120 may determine an option or technique to use to select resources for the urgent communication based at least in part on an arrival time of the urgent communication at the third UE 120 and/or on an arrival time of a resource selection trigger for the urgent communication. In some aspects, the third UE 120 may determine an option or technique to use to select resources for the urgent communication based at least in part on a reliability or quality of service (QoS) parameter associated with the urgent communication to be transmitted by the third UE 120. For example, for traffic with a high reliability requirement, option 2 or option 3 may be selected as the sensing results are more accurate and/or current (e.g., up to date).

As shown by reference number 815, the third UE 120 may select resources for the urgent communication using option 1 if an arrival of the urgent communication occurs slightly before a resource selection window (RSW as depicted in FIG. 8) or during the resource selection window (e.g., associated with the previous cycle of the collaborative sensing schedule) and/or the PDB of the urgent communication will expire within (or after) the resource selection window. In some aspects, the third UE 120 may determine a number of available resources within the resource selection window based at least in part on the PDB of the urgent communication. For example, in some aspects, the PDB of the urgent communication may expire prior to an end of the resource selection window. The third UE 120 may determine if the number of available resources for the urgent communication within the resource selection window satisfies a threshold. If the number of available resources for the urgent communication within the resource selection window satisfies the threshold, then the third UE 120 may select resources for the urgent communication using option 1. If the number of available resources for the urgent communication within the resource selection window does not satisfy the threshold, then the third UE 120 may not select resources for the urgent communication using option 1 (e.g., and may use another option, such as option 2 or option 3).

As described above in connection with FIG. 7, option 1 may include the third UE 120 selecting resources for the urgent communication based at least in part on the sensing results associated with the previous cycle (e.g., the first cycle sensing results received from the first UE 120) of the collaborative sensing schedule. For example, the third UE 120 may select resources for the urgent communication from the resource selection window associated with the previous cycle of the collaborative sensing schedule.

As shown by reference number 820, an arrival of the urgent communication may occur during the resource selection window associated with the first cycle of the collaborative sensing schedule. Therefore, the third UE 120 may determine that option 1 is to be used to select the resource for the urgent communication (e.g., if a number of available resources in the resource selection window satisfies the threshold, as described above). In some aspects, when selecting resources using option 1, the third UE 120 may perform a re-evaluation and/or preemption checking after selecting the resources for the urgent communication. For example, the third UE 120 may perform channel sensing to determine if another UE 120 has reserved the resources selected by the third UE 120 for the urgent communication. Similarly, the third UE 120 may perform channel sensing to determine if another UE 120 has preempted (e.g., for a high priority transmission) the resources selected by the third UE 120 for the urgent communication. A duration or length of the re-evaluation and/or preemption checking may be based at least in part on an arrival time of the urgent communication (e.g., at the third UE 120), the PDB of the urgent communications, and/or one or more QoS parameters of the urgent communications, among other examples.

As shown by reference number 825, the third UE 120 may select resources for the urgent communication using option 2 or option 3 if an arrival of the urgent communication occurs near the end of or after the resource selection window (e.g., associated with the previous cycle of the collaborative sensing schedule). For example, the third UE 120 may select resources for the urgent communication using option 2 or option 3 if the PDB of the urgent communication does not allow for a threshold amount of resources in the resource selection window and/or if the PDB of the urgent communication will expire prior to a resource selection window associated with the current cycle (e.g., cycle 2).

As shown by reference number 830, the third UE 120 may select resources for the urgent communication using option 2 if an arrival of the urgent communication occurs after the resource selection window associated with the first cycle. As described above in connection with FIG. 7, option 2 may include the third UE 120 performing a shortened channel sensing to determine a channel availability and combining the determined channel availability with the sensing results from the previous cycle to identify available resources for the urgent communication. The third UE 120 may select resources for the urgent communication from the identified available resources. Option 2 provides the benefit that the collaborative sensing schedule remains uninterrupted. For example, the second UE 120 may continue to perform channel sensing and may share the sensing results according to the collaborative sensing schedule when the third UE 120 selects resources for the urgent communication using option 2. However, in some cases, due to the shortened duration of the channel sensing performed by the third UE 120, the third UE 120 may miss or not detect some reservations. As a result, the transmission of the urgent communication may experience interference. In some aspects, the third UE 120 may preempt reserved resources identified by the third UE 120 if the urgent communication is a high priority communication.

As shown by reference number 835, the third UE 120 may select resources for the urgent communication using option 3 if an arrival of the urgent communication occurs after the resource selection window associated with the first cycle. As described above in connection with FIG. 7, option 3 may include the third UE 120 triggering an early sharing of sensing results from the sensing UE (e.g., the second UE 120). The sensing UE may stop or terminate channel sensing and may share sensing results with the third UE 120. The third UE 120 may use the sensing results received from the sensing UE to select resources for the urgent communication. Option 3 provides the benefit of using recent sensing results to select resources for the urgent communication, thereby reducing a likelihood that the urgent communication experiences or causes interference. However, by using option 3, the collaborative sensing schedule may be interrupted or modified. Option 3 is described in more detail below in connection with FIG. 9.

As shown by reference number 840, the third UE 120 may select resources for the urgent communication using option 1 if an arrival of the urgent communication occurs slightly before a resource selection window or during the resource selection window (e.g., associated with the current cycle (cycle 2) of the collaborative sensing schedule) and/or the PDB of the urgent communication will expire within (or after) the resource selection window of the current cycle. Therefore, the third UE 120 is enabled to select resources for the urgent communication using different options depending on a timing and/or a PDB of the urgent communication.

As indicated above, FIG. 8 is provided as an example. Other examples may differ from what is described with respect to FIG. 8.

Figure 9:
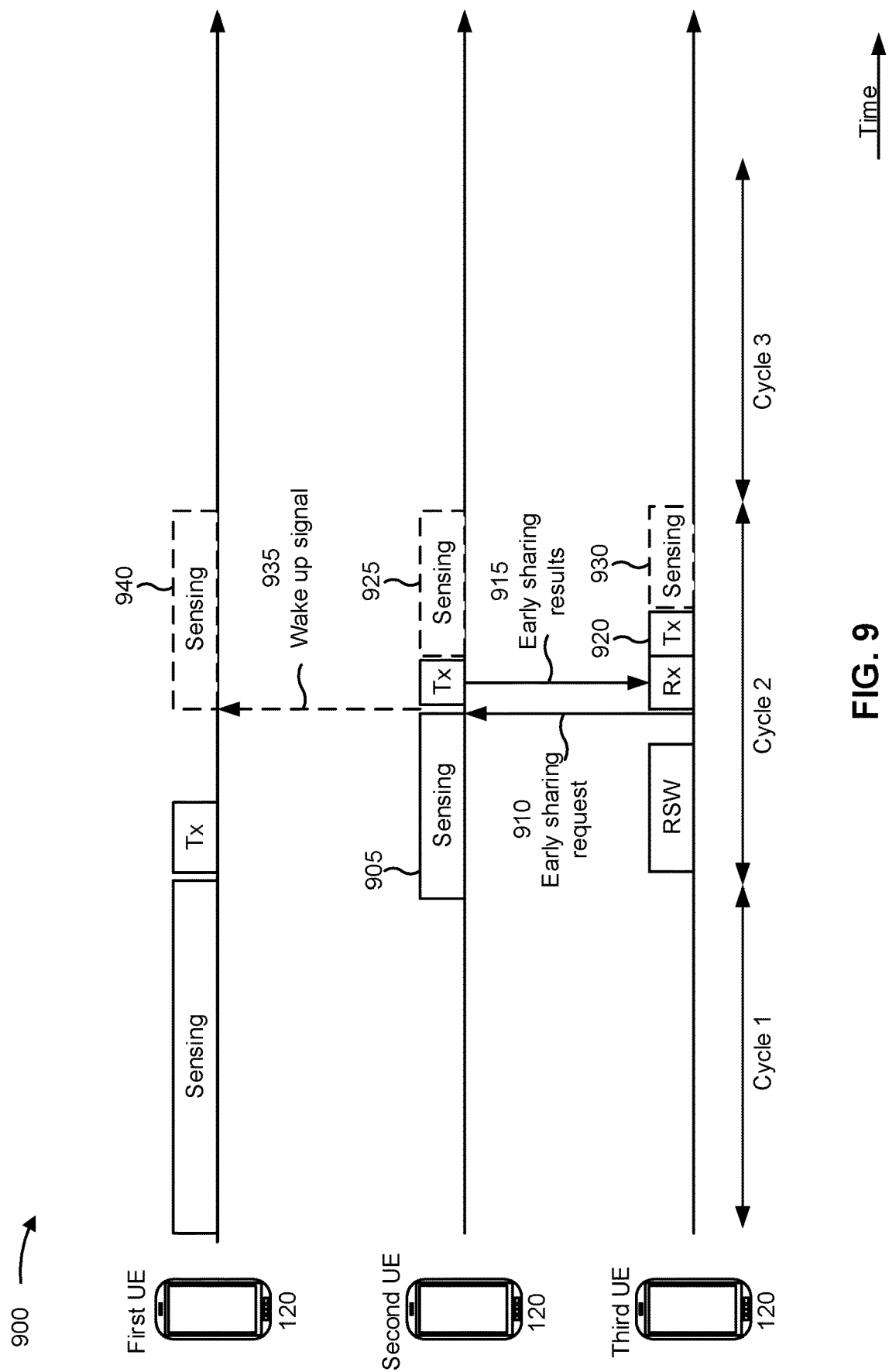

FIG. 9 is a diagram illustrating an example 900 associated with early sharing for collaborative sensing in sidelink, in accordance with various aspects of the present disclosure. As shown in FIG. 9, a first UE 120, a second UE 120, and a third UE 120 may communicate with one another in a wireless network, such as wireless network 100 and/or the sidelink environment described above in connection with FIGS. 3 and 4.

The first UE 120, the second UE 120, and the third UE 120 may communicate with one another to determine a collaborative sensing schedule, as described above in connection with FIGS. 6 and 7. Example 900 may depict a scenario in which a UE 120 (e.g., the third UE 120) selects resources for an urgent communication using option 3, as described above in connection with FIGS. 7 and 8. For example, as shown by reference number 905, during a second cycle (e.g., cycle 2) of the collaborative sensing schedule, the second UE 120 may be a sensing UE (e.g., may be performing channel sensing according to the collaborative sensing schedule). The third UE 120 may identify an urgent communication or an urgent packet that is to be transmitted by the third UE 120 a next sensing results sharing opportunity, a next transmission opportunity, and/or a next resource selection window according to collaborative sensing schedule (e.g., as described above in more detail in connection with FIG. 7).

As shown by reference number 910, the third UE 120 may transmit, to the second UE 120 (e.g., the sensing UE) a request or a trigger for the second UE 120 to share sensing results (e.g., an early sharing request) (e.g., using controller/processor 280, transmit processor 264, TX MIMO processor 266, MOD 254, antenna 252, memory 282, and/or transmission component 1104 depicted in FIG. 11). As described above in connection with FIG. 7, the third UE 120 may use reserved, pre-configured, and/or negotiated resources to transmit the request or trigger for the second UE 120 to share sensing results. The resources used by the third UE 120 to transmit the request or trigger for the sensing results may be reserved resources for requests or triggers for sensing results. The reserved resources may be configured at one or more UEs 120 included in the group of UEs associated with the collaborative sensing schedule (e.g., the first UE 120, the second UE 120, and/or the third UE 120). In some aspects, the resources may be negotiated between the group of UEs associated with the collaborative sensing schedule (e.g., when determining the collaborative sensing schedule). For example, the group of UEs may communicate to negotiate and/or determine one or more transmission opportunities or occasions for early sharing requests.

The early sharing request may be transmitted by the third UE 120 via an SCI message (e.g., an SCI-2 message), a PSSCH message, a PSFCH message, and/or an upper layer signaling message, among other examples. In some aspects, the early sharing request may be a single bit message (e.g., a one bit message). In some aspects, the early sharing request may be a multi-bit message. In some aspects, the early sharing request may indicate a PDB of the urgent communication, a traffic priority level of the urgent communication, and/or capability information of the third UE 120 (e.g., to enable the sensing UE to determine when and/or how to share the sensing results), among other examples. In some aspects, the sensing UE may determine an option or technique (e.g., option 1, option 2, or option 3) for the third UE 120 to use to select resources for the urgent communication after receiving the early sharing request. For example, the sensing UE may determine an option or technique (e.g., option 1, option 2, or option 3) for the third UE 120 to use based at least in part on a sensing and/or transmission capability of the sensing UE and/or based at least in part on the information indicated in the early sharing request. The sensing UE may indicate the determined option or technique to the third UE 120 in response to the early sharing request.

The second UE 120 may receive, from the third UE 120, the request or trigger for the second UE 120 to share sensing results (e.g., using antenna 252, DEMOD 254, MIMO detector 256, receive processor 258, controller/processor 280, memory 282, and/or reception component 1102 depicted in FIG. 11). The second UE 120 may stop or terminate channel sensing that is being performed by the second UE 120 according to the collaborative sensing schedule. The second UE 120 may determine a channel availability (e.g., sensing results) based at least in part on the channel sensing performed by the second UE 120 prior to receiving the request or trigger for the second UE 120 to share sensing results (e.g., using controller/processor 280, memory 282, and/or channel sensing component 1112 depicted in FIG. 11).

As shown by reference number 915, the second UE 120 may transmit, to the third UE 120, the sensing results (e.g., that are based at least in part on the channel sensing performed by the second UE 120 prior to receiving the request or trigger for the second UE 120 to share sensing results) (e.g., using controller/processor 280, transmit processor 264, TX MIMO processor 266, MOD 254, antenna 252, memory 282, and/or transmission component 1104 depicted in FIG. 11). In some aspects, the second UE 120 may transmit the sensing results to the second UE 120 (e.g., in a dedicated message). In some aspects, the second UE 120 may broadcast the sensing results such that any other UEs 120 in the group (e.g., the first UE 120) are enabled to receive the sensing results.

The third UE 120 may receive, from the second UE 120 (e.g., the sensing UE), the sensing results (e.g., using antenna 252, DEMOD 254, MIMO detector 256, receive processor 258, controller/processor 280, memory 282, and/or reception component 1102 depicted in FIG. 11). The third UE 120 may select resources for the urgent communication based at least in part on the sensing results received from the second UE 120 (e.g., using controller/processor 280, memory 282, and/or resource selection component 1110). As shown by reference number 920, the third UE 120 may transmit the urgent communication using the resources selected by the third UE 120 (e.g., using controller/processor 280, transmit processor 264, TX MIMO processor 266, MOD 254, antenna 252, memory 282, and/or transmission component 1104 depicted in FIG. 11).

In some aspects, as shown by reference number 925, the second UE 120 (e.g., the sensing UE) may resume channel sensing after transmitting the sensing results. For example, the second UE 120 may perform channel sensing according to the collaborative sensing schedule after transmitting the sensing results. At the next sensing results sharing opportunity (e.g., at the end of the second cycle), the second UE 120 may determine a channel availability (e.g., sensing results for the second cycle) based at least in part on the sensing results obtained from performing channel sensing prior to receiving the request or trigger (e.g., shown by reference number 905), the resources used by the second UE 120 to transmit the sensing results, the resources used by the third UE 120 to transmit the urgent communication, and the channel sensing performed by the second UE 120 after transmitting the sensing results (e.g., shown by reference number 925). The second UE 120 may transmit (e.g., to the first UE 120 and the third UE 120) the sensing results, as determined above, at the next sensing results sharing opportunity (e.g., at the end of the second cycle).

In some aspects, as shown by reference number 930, the third UE 120 may begin channel sensing after transmitting the urgent communication (e.g., rather than the second UE 120 resuming channel sensing, as described above). For example, the third UE 120 may initiate channel sensing after transmitting the urgent communication according to the collaborative sensing schedule (e.g., until the next sensing results sharing opportunity and/or the end of the second cycle). At the next sensing results sharing opportunity (e.g., at the end of the second cycle), the third UE 120 may determine a channel availability (e.g., sensing results for the second cycle) based at least in part on the sensing results received from the second UE 120, the resources used by the second UE 120 to transmit the sensing results, the resources used by the third UE 120 to transmit the urgent communication, and the channel sensing performed by the third UE 120 after transmitting the urgent communication (e.g., shown by reference number 930). The third UE 120 may transmit (e.g., to the first UE 120 and the second UE 120) the sensing results, as determined above, at the next sensing results sharing opportunity (e.g., at the end of the second cycle). The third UE 120 may consume additional power resources by performing channel sensing after transmitting the urgent communication according to the collaborative sensing schedule (e.g., until the next sensing results sharing opportunity and/or the end of the second cycle) as a result of requesting an early sharing of sensing results and/or interrupting the collaborative sensing schedule.

In some aspects, the sensing UE (e.g., the second UE 120) may, based at least in part on receiving the request or trigger for early sharing of sensing results, wake up and/or trigger another UE (e.g., the first UE 120) to cause the other UE to begin channel sensing according to the collaborative sensing schedule (e.g., until the next sensing results sharing opportunity and/or the end of the second cycle). For example, as shown by reference number 935, the second UE 120 may transmit, to the first UE 120, a signal to cause the first UE 120 to begin channel sensing according to the collaborative sensing schedule (e.g., using controller/processor 280, transmit processor 264, TX MIMO processor 266, MOD 254, antenna 252, memory 282, and/or transmission component 1104 depicted in FIG. 11).

In some aspects, the signal may be a wakeup signal (WUS). In some aspects, the sensing UE (e.g., the second UE 120) may determine or identify the UE to wake up and/or trigger based at least in part on one or more factors. For example, a factor may be identifying a next WUS occasion. For example, the group of UEs associated with the collaborative sensing schedule may negotiate one or more WUS occasions for transmitting a WUS. The sensing UE 120 identify a next WUS occasion and a UE associated with the next WUS occasion. In some aspects, a factor may be the collaborative sensing schedule. For example, the sensing UE may identify one or more non-sensing UEs that can be triggered (e.g., with a WUS) to begin channel sensing. The sensing UE may determine or identify a UE, from the one or more non-sensing UEs, that is associated with the most amount of time since performing channel sensing according to the collaborative sensing schedule. The sensing UE may transmit the WUS to the non-sensing UE that is associated with the most amount of time since performing channel sensing according to the collaborative sensing schedule.

As shown by reference number 940, based at least in part on receiving the signal from the second UE 120, the first UE 120 may initiate channel sensing according to the collaborative sensing schedule (e.g., until the next sensing results sharing opportunity and/or the end of the second cycle). In some aspects, the second UE 120 may transmit the signal (e.g., the WUS) to the first UE 120 prior to transmitting the sensing results. This may enable the first UE 120 to begin channel sensing earlier, resulting in less interruption of channel sensing for the collaborative sensing schedule. Additionally, this may enable the first UE 120 to receive the sensing results from the second UE 120 (e.g., to enable the first UE 120 to determine sensing results for the entire second cycle). At the next sensing results sharing opportunity (e.g., at the end of the second cycle), the first UE 120 may determine a channel availability (e.g., sensing results for the second cycle) based at least in part on the sensing results received from the second UE 120 and the channel sensing performed by the first UE 120 (e.g., shown by reference number 940). The first UE 120 may transmit (e.g., to the second UE 120 and the third UE 120) the sensing results, as determined above, at the next sensing results sharing opportunity (e.g., at the end of the second cycle).

In some aspects, when transmitting the sensing results, the UE that transmits the sensing results may indicate that channel sensing was interrupted during the second cycle (e.g., due to the early sharing request from the third UE 120). By indicating that channel sensing was interrupted, the UEs in the group (e.g., the first UE 120, the second UE 120, and the third UE 120) may be notified that some resource reservations may have been missed by the sensing UE(s) during the second cycle. Therefore, by indicating that channel sensing was interrupted, the UEs in the group may be enabled to determine transmit parameters, such as a transmit power and/or a number of resources selected for transmission(s), to mitigate a risk of missed resource reservations. For example, a UE in the group may reduce a transmit power for a transmission to mitigate a risk or likelihood of interference due to missed reservation during the second cycle (e.g., due to the UE selecting resources for the transmission that were reserved by another UE in the missed resource reservation).

In some aspects, when the collaborative sensing schedule is interrupted or modified due to an early sharing request by a non-sensing UE that has an urgent communication to transmit, the collaborative sensing schedule may be modified to compensate for additional power consumption by a UE in the group of UEs caused by the early sharing request. For example, in some aspects, another UE (e.g., the first UE) may perform channel sensing during a cycle that the other UE was not scheduled to perform channel sensing according to the collaborative sensing schedule. As a result, the other UE may have an increased power overhead associated with the unscheduled channel sensing. The group of UEs (e.g., the first UE 120, the second UE 120, and the third UE 120) may communicate to modify or adjust the collaborative sensing schedule to compensate for the increased power overhead consumed by the other UE. In some aspects, the group of UEs may communicate to modify or adjust the collaborative sensing schedule to cause the non-sensing UE that requested the early sharing of sensing results (e.g., the third UE 120) to perform extended and/or additional channel sensing (e.g., to compensate for power overhead consumed by other UEs in the group and/or to punish the non-sensing UE for interrupting the collaborative sensing schedule).

As indicated above, FIG. 9 is provided as an example. Other examples may differ from what is described with respect to FIG. 9.

Figure 10:
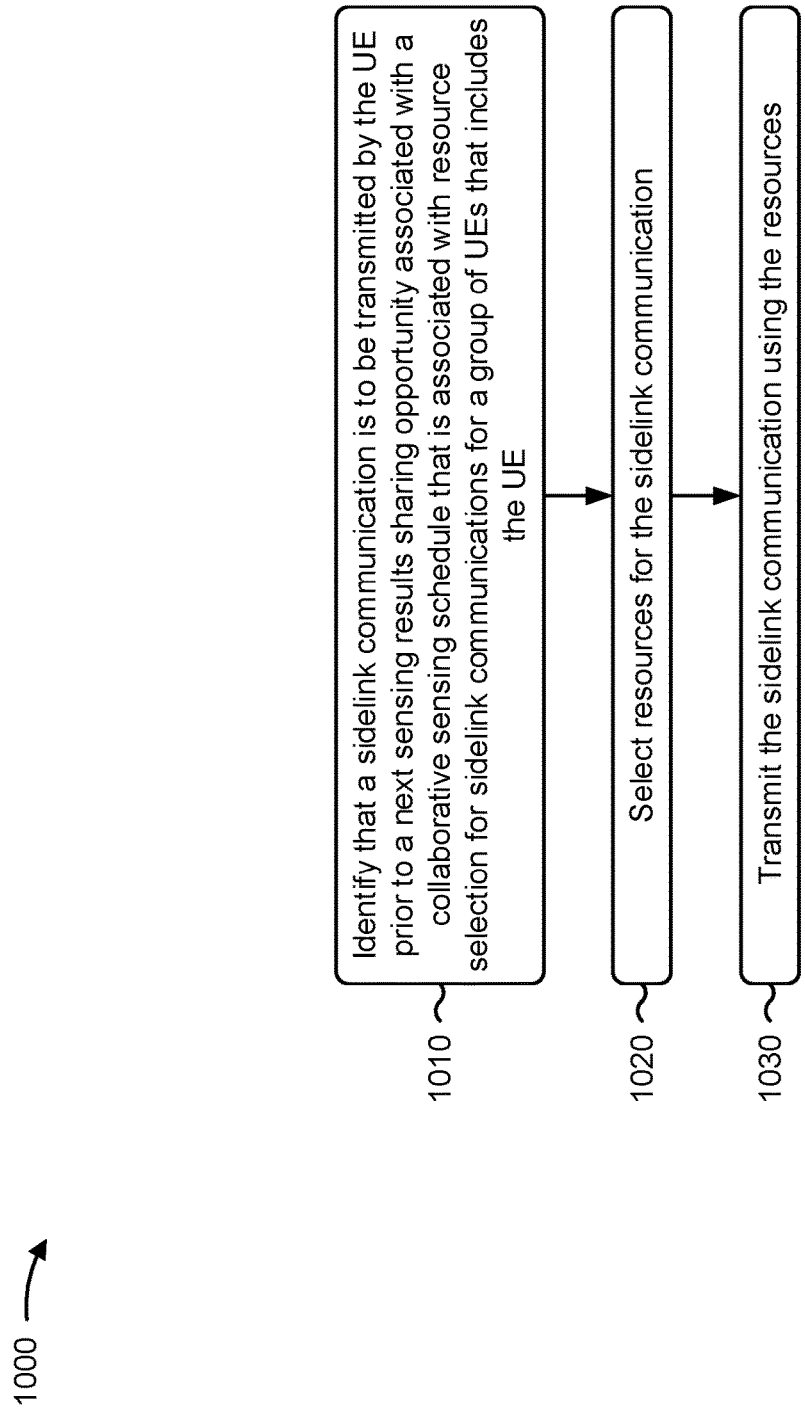
FIG. 10 is a diagram illustrating an example process associated with early sharing for collaborative sensing in sidelink, in accordance with various aspects of the present disclosure.

FIG. 10 is a diagram illustrating an example process 1000 performed, for example, by a UE, in accordance with various aspects of the present disclosure. Example process 1000 is an example where the UE (e.g., UE 120 and/or UE 705) performs operations associated with early sharing for collaborative sensing in sidelink. Example process 1000 may be an example process performed by a non-sensing UE (e.g., the UE 705, the third UE 120 depicted in FIG. 8, and/or the third UE 120 depicted in FIG. 9) associated with a collaborative sensing schedule, as described above in connection with FIGS. 6-9.

As shown in FIG. 10, in some aspects, process 1000 may include identifying that a sidelink communication is to be transmitted by the UE prior to a next sensing results sharing opportunity associated with a collaborative sensing schedule that is associated with resource selection for sidelink communications for a group of UEs that includes the UE (block 1010). For example, the UE (e.g., using identification component 1108, depicted in FIG. 11) may identify that a sidelink communication is to be transmitted by the UE prior to a next sensing results sharing opportunity associated with a collaborative sensing schedule that is associated with resource selection for sidelink communications for a group of UEs that includes the UE, as described above.

As further shown in FIG. 10, in some aspects, process 1000 may include selecting resources for the sidelink communication (block 1020). For example, the UE (e.g., using resource selection component 1110, depicted in FIG. 11) may select resources for the sidelink communication, as described above.

As further shown in FIG. 10, in some aspects, process 1000 may include transmitting the sidelink communication using the resources (block 1030). For example, the UE (e.g., using transmission component 1104, depicted in FIG. 11) may transmit the sidelink communication using the resources, as described above.

Process 1000 may include additional aspects, such as any single aspect or any combination of aspects described below and/or in connection with one or more other processes described elsewhere herein.

In a first aspect, process 1000 includes communicating, with the group of UEs, to determine the collaborative sensing schedule.

In a second aspect, alone or in combination with the first aspect, process 1000 includes receiving, from another UE included in the group of UEs, sensing results, associated with a cycle of the collaborative sensing schedule, that indicate a channel availability for sidelink communications, wherein the sensing results are received prior to identifying that the sidelink communication is to be transmitted by the UE. In a third aspect, alone or in combination with the second aspect, selecting the resources for the sidelink communication comprises selecting the resources for the sidelink communication based at least in part on the sensing results. In a fourth aspect, alone or in combination with the third aspect, selecting the resources for the sidelink communication based at least in part on the sensing results is based at least in part on at least one of identifying that the sidelink communication is to be transmitted by the UE or an expiration of a packet delay budget of the sidelink communication occurring during a resource selection window associated with the cycle of the collaborative sensing schedule.

In a fifth aspect, alone or in combination with one or more of the third through fourth aspects, process 1000 includes identifying, based at least in part on a packet delay budget of the sidelink communication, a number of resources available in a resource selection window associated with the cycle of the collaborative sensing schedule, wherein selecting the resources for the sidelink communication based at least in part on the sensing results is based at least in part on the number of resources available in the resource selection window associated with the cycle satisfying a threshold. In a sixth aspect, alone or in combination with one or more of the third through fifth aspects, selecting the resources for the sidelink communication based at least in part on the sensing results comprises performing an evaluation of the availability of the resources for the sidelink communication.

In a seventh aspect, alone or in combination with the third aspect, selecting the resources for the sidelink communication comprises performing channel sensing to determine a channel availability for sidelink communications based at least in part on identifying that the sidelink communication is to be transmitted by the UE, and selecting the resources for the sidelink communication based at least in part on the channel availability determined by performing the channel sensing and the channel availability indicated by the sensing results. In an eighth aspect, alone or in combination with the seventh aspect, performing channel sensing to determine the channel availability for sidelink communications comprises performing channel sensing for a duration that is less than a duration of sensing windows associated with the collaborative sensing schedule.

In a ninth aspect, alone or in combination with one or more of the first through eighth aspects, selecting the resources for the sidelink communication comprises transmitting, to a sensing UE, included in the group of UEs, that is performing channel sensing in accordance with the collaborative sensing schedule, a request for sensing results based at least in part on identifying that the sidelink communication is to be transmitted by the UE, receiving, from the sensing UE, sensing results that indicate a channel availability for sidelink communications, and selecting the resources for the sidelink communication based at least in part on the sensing results.

In a tenth aspect, alone or in combination with the ninth aspect, transmitting the request for sensing results comprises identifying one or more resources associated with transmitting requests for early sharing of sensing results, and transmitting the request for sensing results using the one or more resources. In an eleventh aspect, alone or in combination with one or more of the ninth through tenth aspects, transmitting the request for sensing results comprises transmitting the request via at least one of a sidelink control information message, a physical sidelink shared channel message, a physical sidelink feedback channel message, or an upper layer signaling message.

In a twelfth aspect, alone or in combination with one or more of the ninth through eleventh aspects, the sensing UE resumes sensing after transmitting the sensing results to the UE, and process 1000 includes receiving, from the sensing UE at the next sensing results sharing opportunity, sensing results that indicate a channel availability for sidelink communications that is based at least in part on: channeling sensing performed by the sensing UE prior to receiving the request for sensing results, channeling sensing performed by the sensing UE after transmitting the sensing results to the UE, resources used by the sensing UE to transmit the sensing results to the UE, and the resources for the sidelink communication selected by the UE.

In a thirteenth aspect, alone or in combination with one or more of the ninth through eleventh aspects, process 1000 includes performing channel sensing to determine a channel availability for sidelink communications after transmitting the sidelink communication, and transmitting, to the group of UEs at the next sensing results sharing opportunity, sensing results that indicate a channel availability for sidelink communications that is based at least in part on the sensing results transmitted by the sensing UE, the channel sensing performed by the UE, resources used by the sensing UE to transmit the sensing results to the UE, and the resources for the sidelink communication selected by the UE.

In a fourteenth aspect, alone or in combination with one or more of the ninth through eleventh aspects, the sensing UE causes another UE, included in the group of UEs, to perform sensing for a remainder of a cycle of the collaborative sensing schedule prior to the sensing UE transmitting the sensing results, and process 1000 includes receiving, from the other UE at the next sensing results sharing opportunity, sensing results that indicate a channel availability for sidelink communications that is based at least in part on channeling sensing performed by the sensing UE prior to receiving the request for sensing results, and channeling sensing performed by the other UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of an identification component 1108, a resource selection component 1110, or a channel sensing component 1112, among other examples.

In some aspects, the apparatus 1100 may be configured to perform one or more operations described herein in connection with FIG. 6-9. Additionally, or alternatively, the apparatus 1100 may be configured to perform one or more processes described herein, such as process 1000 of FIG. 10, or a combination thereof. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The identification component 1108 may identify that a sidelink communication is to be transmitted by the UE prior to a next sensing results sharing opportunity associated with a collaborative sensing schedule that is associated with resource selection for sidelink communications for a group of UEs that includes the UE. The resource selection component 1110 may select resources for the sidelink communication. The transmission component 1104 may transmit the sidelink communication using the resources.

The reception component 1102 and/or the transmission component 1104 may communicate, with the group of UEs, to determine the collaborative sensing schedule.

The reception component 1102 may receive, from another UE included in the group of UEs, sensing results, associated with a cycle of the collaborative sensing schedule, that indicate a channel availability for sidelink communications, wherein the sensing results are received prior to identifying that the sidelink communication is to be transmitted by the UE.

The identification component 1108 may identify, based at least in part on a packet delay budget of the sidelink communication, a number of resources available in a resource selection window associated with the cycle of the collaborative sensing schedule, wherein selecting the resources for the sidelink communication based at least in part on the sensing results is based at least in part on the number of resources available in the resource selection window associated with the cycle satisfying a threshold.

The channel sensing component 1112 may perform channel sensing to determine a channel availability for sidelink communications after transmitting the sidelink communication.

The transmission component 1104 may transmit, to the group of UEs at the next sensing results sharing opportunity, sensing results that indicate a channel availability for sidelink communications that is based at least in part on the sensing results transmitted by the sensing UE, the channel sensing performed by the UE, resources used by the sensing UE to transmit the sensing results to the UE, and the resources for the sidelink communication selected by the UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: identifying that a sidelink communication is to be transmitted by the UE prior to a next sensing results sharing opportunity associated with a collaborative sensing schedule that is associated with resource selection for sidelink communications for a group of UEs that includes the UE; selecting resources for the sidelink communication; and transmitting the sidelink communication using the resources.

Aspect 2: The method of Aspect 1, further comprising: communicating, with the group of UEs, to determine the collaborative sensing schedule.

Aspect 3: The method of any of Aspects 1-2, further comprising: receiving, from another UE included in the group of UEs, sensing results, associated with a cycle of the collaborative sensing schedule, that indicate a channel availability for sidelink communications, wherein the sensing results are received prior to identifying that the sidelink communication is to be transmitted by the UE.

Aspect 4: The method of Aspect 3, wherein selecting the resources for the sidelink communication comprises: selecting the resources for the sidelink communication based at least in part on the sensing results.

Aspect 5: The method of Aspect 4, wherein selecting the resources for the sidelink communication based at least in part on the sensing results is based at least in part on at least one of identifying that the sidelink communication is to be transmitted by the UE or an expiration of a packet delay budget of the sidelink communication occurring during a resource selection window associated with the cycle of the collaborative sensing schedule.

Aspect 6: The method of any of Aspects 4-5, further comprising: identifying, based at least in part on a packet delay budget of the sidelink communication, a number of resources available in a resource selection window associated with the cycle of the collaborative sensing schedule, wherein selecting the resources for the sidelink communication based at least in part on the sensing results is based at least in part on the number of resources available in the resource selection window associated with the cycle satisfying a threshold.

Aspect 7: The method of any of Aspects 4-6, wherein selecting the resources for the sidelink communication based at least in part on the sensing results comprises: performing an evaluation of the availability of the resources for the sidelink communication.

Aspect 8: The method of Aspect 3, wherein selecting the resources for the sidelink communication comprises: performing channel sensing to determine a channel availability for sidelink communications based at least in part on identifying that the sidelink communication is to be transmitted by the UE; and selecting the resources for the sidelink communication based at least in part on the channel availability determined by performing the channel sensing and the channel availability indicated by the sensing results.

Aspect 9: The method of Aspect 8, wherein performing channel sensing to determine the channel availability for sidelink communications comprises: performing channel sensing for a duration that is less than a duration of sensing windows associated with the collaborative sensing schedule.

Aspect 10: The method of any of Aspects 1-9, wherein selecting the resources for the sidelink communication comprises: transmitting, to a sensing UE, included in the group of UEs, that is performing channel sensing in accordance with the collaborative sensing schedule, a request for sensing results based at least in part on identifying that the sidelink communication is to be transmitted by the UE; receiving, from the sensing UE, sensing results that indicate a channel availability for sidelink communications; and selecting the resources for the sidelink communication based at least in part on the sensing results.

Aspect 11: The method of Aspect 10, wherein transmitting the request for sensing results comprises: identifying one or more resources associated with transmitting requests for early sharing of sensing results; and transmitting the request for sensing results using the one or more resources.

Aspect 12: The method of any of Aspects 10-11, wherein transmitting the request for sensing results comprises: transmitting the request via at least one of a sidelink control information message, a physical sidelink shared channel message, a physical sidelink feedback channel message, or an upper layer signaling message.

Aspect 13: The method of any of Aspects 10-12, wherein the sensing UE resumes sensing after transmitting the sensing results to the UE, and further comprising: receiving, from the sensing UE at the next sensing results sharing opportunity, sensing results that indicate a channel availability for sidelink communications that is based at least in part on: channel sensing performed by the sensing UE prior to receiving the request for sensing results, channel sensing performed by the sensing UE after transmitting the sensing results to the UE, resources used by the sensing UE to transmit the sensing results to the UE, and the resources for the sidelink communication selected by the UE.

Aspect 14: The method of any of Aspects 10-12, further comprising: performing channel sensing to determine a channel availability for sidelink communications after transmitting the sidelink communication; and transmitting, to the group of UEs at the next sensing results sharing opportunity, sensing results that indicate a channel availability for sidelink communications that is based at least in part on: the sensing results transmitted by the sensing UE, the channel sensing performed by the UE, resources used by the sensing UE to transmit the sensing results to the UE, and the resources for the sidelink communication selected by the UE.

Aspect 15: The method of any of Aspects 10-12, wherein the sensing UE causes another UE, included in the group of UEs, to perform sensing for a remainder of a cycle of the collaborative sensing schedule prior to the sensing UE transmitting the sensing results, and further comprising: receiving, from the other UE at the next sensing results sharing opportunity, sensing results that indicate a channel availability for sidelink communications that is based at least in part on: channel sensing performed by the sensing UE prior to receiving the request for sensing results, and channel sensing performed by the other UE.

Aspect 16: An apparatus for wireless communication at a device, comprising a processor; memory coupled with the processor; and instructions stored in the memory and executable by the processor to cause the apparatus to perform the method of one or more Aspects of Aspects 1-15.

Aspect 17: A device for wireless communication, comprising a memory and one or more processors coupled to the memory, the memory and the one or more processors configured to perform the method of one or more Aspects of Aspects 1-15.

Aspect 18: An apparatus for wireless communication, comprising at least one means for performing the method of one or more Aspects of Aspects 1-15.

Aspect 19: A non-transitory computer-readable medium storing code for wireless communication, the code comprising instructions executable by a processor to perform the method of one or more Aspects of Aspects 1-15.

Aspect 20: A non-transitory computer-readable medium storing a set of instructions for wireless communication, the set of instructions comprising one or more instructions that, when executed by one or more processors of a device, cause the device to perform the method of one or more Aspects of Aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    identifying, based at least in part on an arrival time of a sidelink communication occurring within a resource selection window or an expiration of a packet delay budget of the sidelink communication occurring within the resource selection window, that the sidelink communication is to be transmitted by the UE prior to a next sensing results sharing opportunity associated with a collaborative sensing schedule that is associated with resource selection for sidelink communications for a group of UEs that includes the UE;
    selecting resources for the sidelink communication; and
    transmitting, prior to the next sensing results sharing opportunity, the sidelink communication using the selected resources.

2. The method of claim 1, further comprising:
    communicating, with the group of UEs, to determine the collaborative sensing schedule.

3. The method of claim 1, further comprising:
    receiving, from another UE included in the group of UEs, sensing results, associated with a cycle of the collaborative sensing schedule, that indicate a channel availability for sidelink communications, wherein the sensing results are received prior to identifying that the sidelink communication is to be transmitted by the UE.

4. The method of claim 3, wherein selecting the resources for the sidelink communication comprises:
selecting the resources for the sidelink communication based at least in part on the sensing results.

5. The method of claim 3, wherein selecting the resources for the sidelink communication comprises:
performing channel sensing to determine a channel availability for sidelink communications based at least in part on identifying that the sidelink communication is to be transmitted by the UE; and
selecting the resources for the sidelink communication based at least in part on the channel availability determined by performing the channel sensing and the channel availability indicated by the sensing results.

6. The method of claim 4, wherein selecting the resources for the sidelink communication based at least in part on the sensing results is based at least in part on at least one of identifying that the sidelink communication is to be transmitted by the UE or an expiration of the packet delay budget of the sidelink communication occurring during a resource selection window associated with the cycle of the collaborative sensing schedule.

7. The method of claim 4, further comprising:
identifying, based at least in part on the packet delay budget of the sidelink communication, a number of resources available in a resource selection window associated with the cycle of the collaborative sensing schedule, wherein selecting the resources for the sidelink communication based at least in part on the sensing results is based at least in part on the number of resources available in the resource selection window associated with the cycle satisfying a threshold.

8. The method of claim 4, wherein selecting the resources for the sidelink communication based at least in part on the sensing results comprises:
performing an evaluation of the availability of the resources for the sidelink communication.

9. The method of claim 5, wherein performing channel sensing to determine the channel availability for sidelink communications comprises:
performing channel sensing for a duration that is less than a duration of sensing windows associated with the collaborative sensing schedule.

10. The method of claim 1, wherein selecting the resources for the sidelink communication comprises:
transmitting, to a sensing UE, included in the group of UEs, that is performing channel sensing in accordance with the collaborative sensing schedule, a request for sensing results based at least in part on identifying that the sidelink communication is to be transmitted by the UE;
receiving, from the sensing UE, sensing results that indicate a channel availability for sidelink communications; and
selecting the resources for the sidelink communication based at least in part on the sensing results.

11. The method of claim 10, wherein transmitting the request for sensing results comprises:
identifying one or more resources associated with transmitting requests for early sharing of sensing results; and
transmitting the request for sensing results using the one or more resources.

12. The method of claim 10, wherein transmitting the request for sensing results comprises:
transmitting the request via at least one of a sidelink control information message, a physical sidelink shared channel message, a physical sidelink feedback channel message, or an upper layer signaling message.

13. The method of claim 10, wherein the sensing UE resumes sensing after transmitting the sensing results to the UE, and further comprising:
receiving, from the sensing UE at the next sensing results sharing opportunity, sensing results that indicate a channel availability for sidelink communications that is based at least in part on:
channel sensing performed by the sensing UE prior to receiving the request for sensing results,
channel sensing performed by the sensing UE after transmitting the sensing results to the UE,
resources used by the sensing UE to transmit the sensing results to the UE, and
the resources for the sidelink communication selected by the UE.

14. The method of claim 10, further comprising:
performing channel sensing to determine a channel availability for sidelink communications after transmitting the sidelink communication; and
transmitting, to the group of UEs at the next sensing results sharing opportunity, sensing results that indicate a channel availability for sidelink communications that is based at least in part on:
the sensing results transmitted by the sensing UE,
the channel sensing performed by the UE,
resources used by the sensing UE to transmit the sensing results to the UE, and
the resources for the sidelink communication selected by the UE.

15. The method of claim 10, wherein the sensing UE causes another UE, included in the group of UEs, to perform sensing for a remainder of a cycle of the collaborative sensing schedule prior to the sensing UE transmitting the sensing results, and further comprising:
receiving, from the other UE at the next sensing results sharing opportunity, sensing results that indicate a channel availability for sidelink communications that is based at least in part on:
channel sensing performed by the sensing UE prior to receiving the request for sensing results, and
channel sensing performed by the other UE.

16. A user equipment (UE) for wireless communication, comprising:
one or more memories; and
one or more processors coupled to the one or more memories, the one or more processors configured to:
identify, based at least in part on an arrival time of a sidelink communication occurring within a resource selection window or an expiration of a packet delay budget of the sidelink communication occurring within the resource selection window, that the sidelink communication is to be transmitted by the UE prior to a next sensing results sharing opportunity associated with a collaborative sensing schedule that is associated with resource selection for sidelink communications for a group of UEs that includes the UE;
select resources for the sidelink communication; and
transmit, prior to the next sensing results sharing opportunity, the sidelink communication using the selected resources.

17. The UE of claim 16, wherein the one or more processors are further configured to:

receive, from another UE included in the group of UEs, sensing results, associated with a cycle of the collaborative sensing schedule, that indicate a channel availability for sidelink communications, wherein the sensing results are received prior to identifying that the sidelink communication is to be transmitted by the UE.

18. The UE of claim 17, wherein the one or more processors, when selecting the resources for the sidelink communication, are configured to:
select the resources for the sidelink communication based at least in part on the sensing results.

19. The UE of claim 17, wherein the one or more processors, when selecting the resources for the sidelink communication, are configured to:
perform channel sensing to determine a channel availability for sidelink communications based at least in part on identifying that the sidelink communication is to be transmitted by the UE; and
select the resources for the sidelink communication based at least in part on the channel availability determined by performing the channel sensing and the channel availability indicated by the sensing results.

20. The UE of claim 18, wherein selecting the resources for the sidelink communication based at least in part on the sensing results is based at least in part on at least one of identifying that the sidelink communication is to be transmitted by the UE or an expiration of the packet delay budget of the sidelink communication occurring during a resource selection window associated with the cycle of the collaborative sensing schedule.

21. The UE of claim 18, wherein the one or more processors are further configured to:
identify, based at least in part on the packet delay budget of the sidelink communication, a number of resources available in a resource selection window associated with the cycle of the collaborative sensing schedule, wherein selecting the resources for the sidelink communication based at least in part on the sensing results is based at least in part on the number of resources available in the resource selection window associated with the cycle satisfying a threshold.

22. The UE of claim 18, wherein the one or more processors, when selecting the resources for the sidelink communication based at least in part on the sensing results, are configured to:
perform an evaluation of the availability of the resources for the sidelink communication.

23. The UE of claim 19, wherein the one or more processors, when performing channel sensing to determine the channel availability for sidelink communications, are configured to:
perform channel sensing for a duration that is less than a duration of sensing windows associated with the collaborative sensing schedule.

24. The UE of claim 16, wherein the one or more processors, when selecting the resources for the sidelink communication, are configured to:
transmit, to a sensing UE, included in the group of UEs, that is performing channel sensing in accordance with the collaborative sensing schedule, a request for sensing results based at least in part on identifying that the sidelink communication is to be transmitted by the UE;
receive, from the sensing UE, sensing results that indicate a channel availability for sidelink communications; and
select the resources for the sidelink communication based at least in part on the sensing results.

25. The UE of claim 24, wherein the one or more processors, when transmitting the request for sensing results, are configured to:
identify one or more resources associated with transmitting requests for early sharing of sensing results; and
transmit the request for sensing results using the one or more resources.

26. The UE of claim 24, wherein the sensing UE resumes sensing after transmitting the sensing results to the UE, wherein the one or more processors are further configured to:
receive, from the sensing UE at the next sensing results sharing opportunity, sensing results that indicate a channel availability for sidelink communications that is based at least in part on:
channel sensing performed by the sensing UE prior to receiving the request for sensing results,
channel sensing performed by the sensing UE after transmitting the sensing results to the UE,
resources used by the sensing UE to transmit the sensing results to the UE, and
the resources for the sidelink communication selected by the UE.

27. The UE of claim 24, wherein the one or more processors are further configured to:
perform channel sensing to determine a channel availability for sidelink communications after transmitting the sidelink communication; and
transmit, to the group of UEs at the next sensing results sharing opportunity, sensing results that indicate a channel availability for sidelink communications that is based at least in part on:
the sensing results transmitted by the sensing UE,
the channel sensing performed by the UE,
resources used by the sensing UE to transmit the sensing results to the UE, and
the resources for the sidelink communication selected by the UE.

28. The UE of claim 24, wherein the sensing UE causes another UE, included in the group of UEs, to perform sensing for a remainder of a cycle of the collaborative sensing schedule prior to the sensing UE transmitting the sensing results, wherein the one or more processors are further configured to:
receive, from the other UE at the next sensing results sharing opportunity, sensing results that indicate a channel availability for sidelink communications that is based at least in part on:
channel sensing performed by the sensing UE prior to receiving the request for sensing results, and
channel sensing performed by the other UE.

29. A non-transitory computer-readable medium storing a set of instructions for wireless communication, the set of instructions comprising:
one or more instructions that, when executed by one or more processors of a user equipment (UE), cause the UE to:
identify, based at least in part on an arrival time of a sidelink communication occurring within a resource selection window or an expiration of a packet delay budget of the sidelink communication occurring within the resource selection window, that the sidelink communication is to be transmitted by the UE prior to a next sensing results sharing opportunity associated with a collaborative sensing schedule that is associated with resource selection for sidelink communications for a group of UEs that includes the UE;

select resources for the sidelink communication; and transmit, prior to the next sensing results sharing opportunity, the sidelink communication using the selected resources.

30. An apparatus for wireless communication, comprising:

means for identifying, based at least in part on an arrival time of a sidelink communication occurring within a resource selection window or an expiration of a packet delay budget of the sidelink communication occurring within the resource selection window, that the sidelink communication is to be transmitted by the apparatus prior to a next sensing results sharing opportunity associated with a collaborative sensing schedule that is associated with resource selection for sidelink communications for a group of apparatuses that includes the apparatus;

means for selecting resources for the sidelink communication; and means for transmitting, prior to the next sensing results sharing opportunity, the sidelink communication using the selected resources.

* * * * *